US011619172B1

(12) United States Patent
Bower et al.

(10) Patent No.: US 11,619,172 B1
(45) Date of Patent: Apr. 4, 2023

(54) DETONATION COMBUSTION SYSTEMS

(71) Applicant: General Electric Company, Schenectady, NY (US)

(72) Inventors: Hannah Erin Bower, Niskayuna, NY (US); Daniel Louis Depperschmidt, Saratoga Springs, NY (US); Kapil Kumar Singh, Rexford, NY (US); Sarah Marie Monahan, Latham, NY (US); Arin Elspeth Lastufka Cross, Waterford, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/683,445

(22) Filed: Mar. 1, 2022

(51) Int. Cl.
*F23R 3/00* (2006.01)
*F02C 7/264* (2006.01)

(52) U.S. Cl.
CPC ............... *F02C 7/264* (2013.01); *F23R 3/00* (2013.01); *F05D 2240/35* (2013.01)

(58) Field of Classification Search
CPC .... F23R 7/00; F23R 3/346; F23R 3/50; F02K 7/00; F02K 7/06; F02K 7/08; F02K 7/10; F02K 7/20; F05D 2240/35; Y02T 50/60
See application file for complete search history.

(56) References Cited

U.S. PATENT DOCUMENTS

| | | | | |
|---|---|---|---|---|
| 6,883,304 | B2 * | 4/2005 | Ouellette | F02C 5/00 60/39.76 |
| 7,137,243 | B2 * | 11/2006 | Snyder | F02C 5/12 60/39.38 |

(Continued)

FOREIGN PATENT DOCUMENTS

| | | |
|---|---|---|
| CN | 106285945 A | 1/2017 |
| CN | 111927625 A | 11/2020 |

(Continued)

OTHER PUBLICATIONS

Dempsey et al., Performance Optimization of Gas Turbines Utilizing Four-Port Wave Rotors, AIAA 2006-4152, 4th International Energy Conversion Engineering Conference an Exhibit, Jun. 26-29, 2006, San Diego California, 14 Pages.

Lu et al., Rotating Detonation Wave Propulsion: Experimental Challenges, Modeling, and Engine Concepts (Invited), AIAA-2011-6043, 47th AIAA/ASME/SAE/ASEE Joint Propulsion Conference & Exhibit, Jul. 31-Aug. 3, 2011, San Diego, California, 20 Pages.

(Continued)

*Primary Examiner* — Craig Kim
(74) *Attorney, Agent, or Firm* — Dority & Manning, P.A.

(57) ABSTRACT

A detonation combustion system includes a detonation combustor. The detonation combustor includes a detonation manifold and one or more detonation chamber walls defining a detonation chamber. The detonation manifold includes a plurality of detonation fluid pathways defined by a monolithic structure of the detonation manifold, and a plurality of detonation orifice groups respectively including a plurality of detonation orifices disposed about a surface of the detonation manifold. Respective ones of the plurality of detonation orifice groups provide fluid communication from a corresponding one of the plurality of detonation fluid pathways to the detonation chamber through the plurality of detonation orifices corresponding to the respective one of the plurality of detonation orifice groups. The plurality of detonation orifices may be symmetrically oriented about a reference element of the detonation combustor.

20 Claims, 12 Drawing Sheets

(56) References Cited

U.S. PATENT DOCUMENTS

| | | | |
|---|---|---|---|
| 7,251,928 B2* | 8/2007 | Kojima | F02K 7/06 60/39.39 |
| 7,621,118 B2* | 11/2009 | Snyder | F23R 7/00 60/39.38 |
| 7,721,523 B2 | 5/2010 | Tangirala et al. | |
| 8,127,533 B2* | 3/2012 | Lu | F02C 5/12 60/39.38 |
| 9,068,748 B2* | 6/2015 | Hoke | F23R 3/06 |
| 9,512,805 B2* | 12/2016 | Snyder | F23R 3/50 |
| 9,797,601 B2 | 10/2017 | Cheung et al. | |
| 9,958,162 B2 | 5/2018 | Dai et al. | |
| 10,060,618 B2* | 8/2018 | Juan | F23R 7/00 |
| 10,060,629 B2 | 8/2018 | Kim et al. | |
| 10,330,320 B2 | 6/2019 | Snyder, III | |
| 10,436,110 B2* | 10/2019 | Holley | F02C 5/12 |
| 10,627,111 B2* | 4/2020 | Holley | F23R 3/346 |
| 10,641,169 B2* | 5/2020 | Vise | F23R 3/002 |
| 11,255,544 B2* | 2/2022 | Dyson | F02C 3/04 |
| 11,359,578 B2* | 6/2022 | Pal | F02K 7/08 |
| 2007/0183890 A1 | 8/2007 | Nolcheff et al. | |
| 2009/0266047 A1 | 10/2009 | Kenyon et al. | |
| 2012/0216503 A1* | 8/2012 | Snyder | F23R 3/56 60/39.38 |
| 2012/0216504 A1* | 8/2012 | Snyder | F23R 7/00 60/722 |
| 2014/0291418 A1 | 10/2014 | Ruffing et al. | |
| 2016/0123596 A1 | 5/2016 | Hoke et al. | |
| 2016/0258627 A1 | 9/2016 | Cheung et al. | |
| 2016/0320063 A1 | 11/2016 | Dai et al. | |
| 2018/0094814 A1 | 4/2018 | Proscia | |
| 2018/0094817 A1 | 4/2018 | Proscia | |
| 2018/0156463 A1 | 6/2018 | Dai et al. | |
| 2018/0156464 A1 | 6/2018 | Dai et al. | |
| 2018/0231256 A1 | 8/2018 | Pal et al. | |
| 2018/0274439 A1 | 9/2018 | Holley et al. | |
| 2018/0274787 A1 | 9/2018 | Greene et al. | |
| 2018/0355822 A1 | 12/2018 | Vise et al. | |
| 2018/0356093 A1 | 12/2018 | Pal et al. | |
| 2019/0093880 A1 | 3/2019 | Juan | |
| 2020/0063968 A1 | 2/2020 | Gutmark et al. | |
| 2020/0362724 A1* | 11/2020 | Binek | F23R 3/54 |
| 2021/0156564 A1* | 5/2021 | Prociw | F23R 3/005 |
| 2022/0260016 A1* | 8/2022 | Dudebout | F02C 7/12 |
| 2022/0321071 A1* | 10/2022 | Noori | H03F 1/56 |

FOREIGN PATENT DOCUMENTS

| | | | |
|---|---|---|---|
| DE | 827890 C | 1/1952 | |
| EP | 2312126 A1 | 4/2011 | |
| WO | WO-2021243832 A1 * | 12/2021 | F23R 7/00 |

OTHER PUBLICATIONS

Rui et al., Progress of Continuously Rotating Detonation Engines, Chinese Journal of Aeronautics (CSAA), 2016, vol. 29, No. 1, pp. 15-29.

Zuniga, Investigation of Detonation Theory and the Continuously Rotating Detonation Engine, Master of Science in Aerospace Engineering San Jose University, May 2018, 54 Pages.

* cited by examiner

DETONATION COMBUSTION SYSTEMS

FEDERALLY-SPONSORED RESEARCH

This invention was made with government support under contract number FA8650-19-D-2507 awarded by the United States Air Force and the United States Navy. The U.S. government may have certain rights in the invention.

FIELD

The present disclosure generally pertains to detonation combustion systems for engines, such as turbine engines, as well as methods of operating a detonation combustion system. More particularly, the preset disclosure generally pertains to detonation combustion systems.

BACKGROUND

Combustion systems that have an ability to operate over a wide range of operating conditions and thermal load requirements are of interest in the art, as are combustion systems that exhibit good operating performance, including good combustion efficiency, good fuel consumption, and/or low emissions. The art has shown an increasing interest in detonation combustion processes. Accordingly, it would be welcomed in the art to provide combustion systems configured to perform detonation combustion processes, including combustion systems that offer improved performance and/or an ability to operate over a wider range of operating conditions and thermal load requirements.

BRIEF DESCRIPTION OF THE DRAWINGS

A full and enabling disclosure, including the best mode thereof, directed to one of ordinary skill in the art, is set forth in the specification, which makes reference to the appended Figures, in which.

Figure 1A:
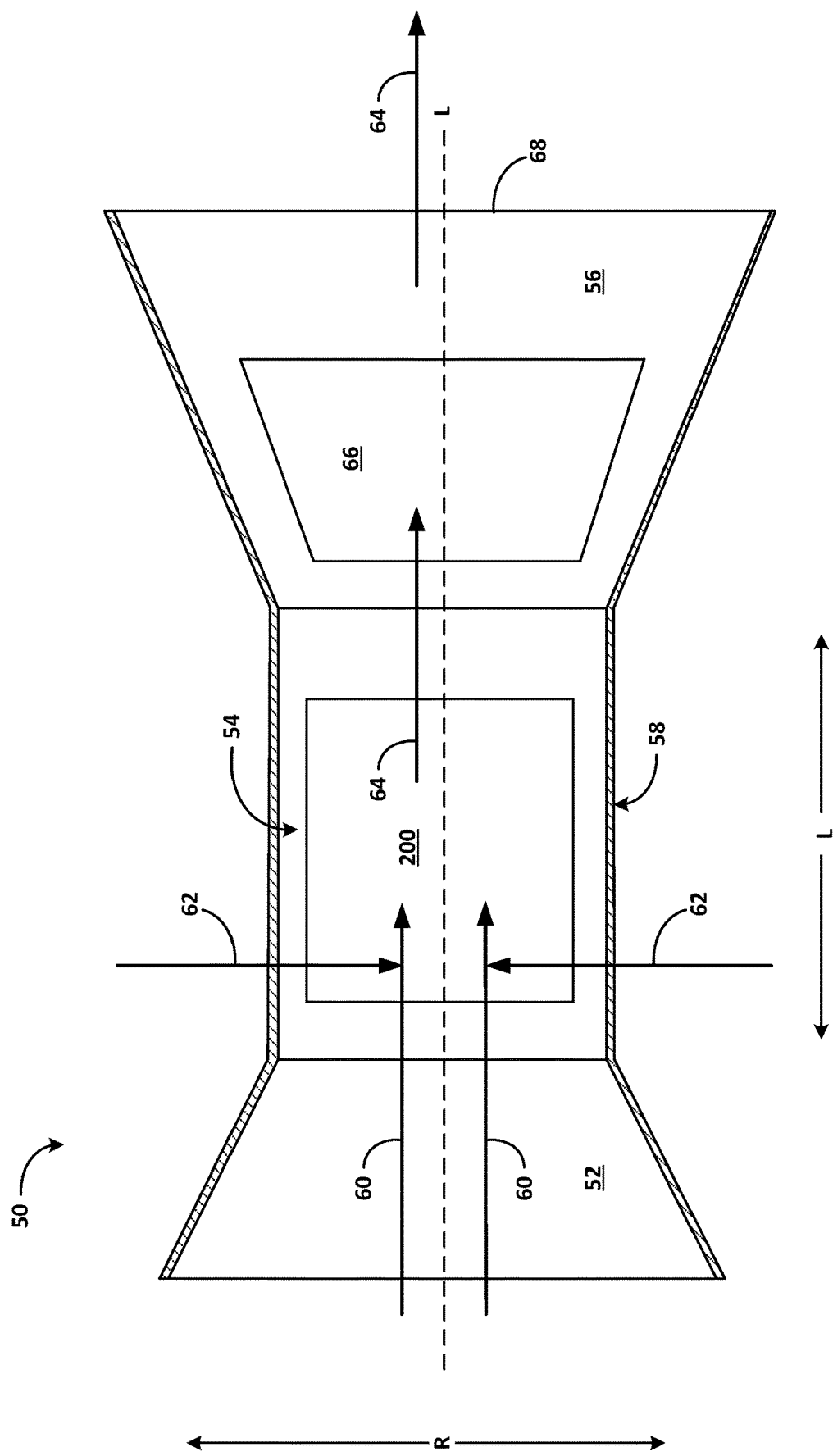
FIG. 1A shows a schematic cross-sectional view of an engine that includes a detonation combustion system.

Repeat use of reference characters in the present specification and drawings is intended to represent the same or analogous features or elements of the present disclosure.

DETAILED DESCRIPTION

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "upper", "lower", "right", "left", "vertical", "horizontal", "top", "bottom", "lateral", "longitudinal", and so forth, shall relate to the disclosure as it is oriented in the drawing figures. However, it is to be understood that the disclosure may assume various alternative orientations, except where expressly specified to the contrary. It is also to be understood that the specific devices illustrated in the attached drawings, and described in the following specification, are simply exemplary embodiments of the disclosure. Hence, specific dimensions and other physical characteristics related to the embodiments disclosed herein are not to be considered as limiting.

The terms "forward" and "aft" refer to relative positions within a turbine engine, with forward referring to a position closer to an engine inlet and aft referring to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The singular forms "a", "an", and "the" include plural references unless the context clearly dictates otherwise.

The terms "coupled," "fixed," "attached to," and the like, refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Additionally, the terms "low," "high," or their respective comparative degrees (e.g., lower, higher, where applicable) each refers to relative speeds within an engine, unless otherwise specified. For example, a "low-pressure turbine" operates at a pressure generally lower than a "high-pressure turbine." Alternatively, unless otherwise specified, the aforementioned terms may be understood in their superlative degree. For example, a "low-pressure turbine" may refer to the lowest maximum pressure turbine within a turbine section, and a "high-pressure turbine" may refer to the highest maximum pressure turbine within the turbine section.

The term "turbomachine" refers to a machine that includes a combustor section and a turbine section with one or more turbines that together generate a thrust output and/or a torque output. In some embodiments, a turbomachine may include a compressor section with one or more compressors that compress air or gases flowing to the combustor section.

As used herein, the term "turbine engine" refers to an engine that may include a turbomachine as all or a portion of its power source. Example turbine engines include gas turbine engines, as well as hybrid-electric turbine engines, such as turbofan engines, turboprop engines, turbojet engines, turboshaft engines, and the like.

One or more components of the engines described herein may be manufactured or formed using any suitable process, such as an additive manufacturing process, such as a 3-D printing process. The use of such a process may allow such component to be formed integrally, as a single monolithic component, or as any suitable number of sub-components. In particular, the additive manufacturing process may allow such component to be integrally formed and include a variety of features not possible when using prior manufacturing methods. For example, the additive manufacturing methods described herein may allow for the manufacture of passages, conduits, cavities, openings, casings, manifolds, double-walls, heat exchangers, or other components, or particular positionings and integrations of such components, having unique features, configurations, thicknesses, materials, densities, fluid passageways, headers, and mounting structures that may not have been possible or practical using prior manufacturing methods. Some of these features are described herein.

Suitable additive manufacturing technologies in accordance with the present disclosure include, for example, Selective Laser Melting (SLM), Direct Metal Laser Melting (DMLM), Fused Deposition Modeling (FDM), Selective Laser Sintering (SLS), 3D printing such as by inkjets, laser jets, and binder jets, Stereolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), and other known processes.

Suitable powder materials for the manufacture of the structures provided herein as integral, unitary, structures include metallic alloy, polymer, or ceramic powders. Exemplary metallic powder materials are stainless-steel alloys, cobalt-chrome alloys, aluminum alloys, titanium alloys, nickel-based superalloys, and cobalt-based superalloys. In addition, suitable alloys may include those that have been engineered to have good oxidation resistance, known as "superalloys" which have acceptable strength at the elevated temperatures of operation in a turbine engine, e.g. Hastelloy, Inconel® alloys (e.g., IN 738, IN 792, IN 939), Rene alloys (e.g., Rene N4, Rene N5, Rene 80, Rene 142, Rene 195), Haynes alloys, Mar M, CM 247, CM 247 LC, C263, 718, X-850, ECY 768, 282, X45, PWA 1483 and CMSX (e.g. CMSX-4) single crystal alloys. The manufactured objects of the present disclosure may be formed with one or more selected crystalline microstructures, such as directionally solidified ("DS") or single-crystal ("SX").

As used herein, the terms "integral", "unitary", or "monolithic" as used to describe a structure refer to the structure being formed integrally of a continuous material or group of materials with no seams, connections joints, or the like. The integral, unitary structures described herein may be formed through additive manufacturing to have the described structure, or alternatively through a casting process, etc.

The present disclosure generally provides combustion systems that are configured to perform detonation combustion, as well as engines that include such a combustion system. Exemplary engines that may be configured to perform both deflagration combustion and detonation combustion include turbine engines, rocket engines, ramjets, or a combination thereof, such as turbo-rocket engines, turbo-ramjets, or rocket-ramjets. Such combustion systems may include a detonation chamber configured to perform detonation combustion, and a detonation manifold configured to supply detonation fluid to the detonation chamber. The detonation manifold may include a plurality of separate detonation fluid pathways respectively configured to supply different detonation fluids to the detonation chamber, and/or to supply detonation fluid to the detonation chamber with respectively different fluid dynamics, such as volumetric flow rate, flow velocity, pressure, and/or pressure drop.

The presently disclosed detonation combustion systems may allow for a wider range of operating conditions and/or increased operating flexibility. For example, respective ones of the plurality of detonation fluid pathways may be utilized for respectively different operating conditions. The respective detonation fluid pathways may fluidly communicate with the detonation chamber through a plurality of detonation orifices disposed about a surface of the detonation manifold. The detonation orifices corresponding to a respective detonation fluid pathway may define a detonation orifice group. In some embodiments, a detonation combustion system may include a first detonation fluid pathway in fluid communication with the detonation chamber through a relatively fewer number of detonation orifices, configured, for example, for operation at lower flow rates such as to provide a lower level of thrust. The detonation combustion system may include a second detonation fluid pathway in fluid communication with the detonation chamber through a relatively greater number of detonation orifices, configured, for example, for operation at higher flow rates such as to provide a higher level of thrust.

In some embodiments, the plurality of detonation fluid pathways and/or corresponding detonation orifice groups may be configured such that the flow rate of the detonation fluid through the respective detonation fluid pathway may be proportional to the number of detonation orifices in the respective detonation orifice group. For example, the respective detonation orifice groups may be configured to provide detonation fluid through the respective detonation orifices under choked flow conditions.

In some embodiments, the detonation orifices may have a symmetric orientation with respect to a reference element of the detonation combustor about which the plurality of detonation orifices are oriented. The symmetric orientation may provide for comparable and/or suitable fluid dynamics with respect to detonation fluid introduced to the detonation chamber through respective detonation fluid pathways, for example, as may be desired and/or suitable for respectively different operating conditions. Additionally, or in the alternative, the symmetric orientation may provide for comparable and/or suitable combustion dynamics, such as detonation dynamics, with respect to detonation fluid introduced to the detonation chamber through respective detonation fluid pathways, for example, as may be desired and/or suitable for respectively different operating conditions. The reference element of the detonation combustor about which the plurality of detonation orifices may be oriented may include a reference element of the detonation chamber and/or a reference element of the detonation manifold.

As an example, a reference element of the detonation combustor may include a longitudinal axis of the detonation chamber and/or of the detonation manifold, a detonation chamber wall circumferentially surrounding a longitudinal axis of the detonation chamber, a detonation manifold wall circumferentially surrounding a longitudinal axis of the detonation manifold, an annular midplane, and/or a meridian line located at a longitudinal position along the longitudinal axis that defines a perimeter of at least one of: the detonation chamber wall, the detonation manifold wall, and the annular midplane. The term "annular midplane," as used herein with reference to the detonation combustor refers to one or more planes that collectively circumferentially surround a longitudinal axis of the detonation chamber at a location corresponding to a volumetric center of the detonation chamber and/or that collectively circumferentially surround a longitudinal axis of the detonation manifold at a location corresponding to a volumetric center of the detonation manifold. By way of example, an annular midplane may include a cylindrical shape, an elliptical cylinder shape, a curvilinear shape, a polygonal shape, as well as a combination of such shapes. By way of example, a meridian line corresponding to such annular midplane may include a circular line corresponding to a perimeter of the cylindrical shape, an elliptical line corresponding to a perimeter of the elliptical cylinder shape, a curvilinear line corresponding to a perimeter of the curvilinear cylinder shape, or a polygonal line corresponding to a perimeter of the polygonal shape.

By providing a symmetric orientation of the detonation orifices as among the respective detonation office groups and/or as between the respective detonation orifice groups, operating variables associated with a location that detonation fluid enters the detonation chamber may be normalized for a plurality of different operating conditions. Additionally, or in the alternative, such operating variables may be tailored to accommodate respectively different operating conditions. By way of example, combustion dynamics may be influenced by a location that detonation fluid enters the detonation chamber in relation to one or more reference elements of the detonation chamber.

Exemplary detonation manifolds may include a plurality of detonation orifices that have a symmetric orientation with respect to one or more of such reference elements of the detonation combustor. The term "symmetric orientation" or "symmetrically oriented," as used herein in relation to a plurality of detonation orifices, refers to a plurality of detonation orifices that collectively define a geometric perimeter that has symmetry in relation to a reference element of the detonation combustor about which the plurality of detonation orifices are oriented. By way of example, a longitudinal axis of the detonation chamber and/or of the detonation manifold, a detonation chamber wall circumferentially surrounding a longitudinal axis of the detonation chamber, a detonation manifold wall circumferentially surrounding a longitudinal axis of the detonation manifold, an annular midplane, and/or a meridian line located at a longitudinal position along the longitudinal axis that defines a perimeter of at least one of: the detonation chamber wall, the detonation manifold wall, and the annular midplane. The plurality of detonation orifices may be symmetrically adjacent to one another. The term "symmetrically adjacent," as used herein in relation to a plurality of detonation orifices, refers to a plurality of detonation orifices that are respectively adjacent to one another and that collectively define a geometric perimeter that has a symmetric orientation in relation to a reference element.

In some embodiments, the symmetric orientation of the plurality of detonation orifices may include an axisymmetric orientation. The term "axisymmetric orientation" or "axisymmetrically oriented," as used herein in relation to a plurality of detonation orifices, refers to a plurality of detonation orifices that collectively define a geometric perimeter that has symmetry in relation to an axis about which the plurality of detonation orifices are oriented. For example, the axis about which the plurality of detonation orifices are oriented may be a longitudinal axis of the detonation chamber and/or a longitudinal axis of the detonation manifold. The plurality of detonation orifices may be axisymmetrically adjacent to one another. The term "axisymmetrically adjacent," as used herein in relation to a plurality of detonation orifices, refers to a plurality of detonation orifices that are adjacent to one another and that collectively define a geometric perimeter that has an axisymmetric orientation in relation to a reference element of the detonation combustor about which the plurality of detonation orifices are oriented.

In some embodiments, the symmetric orientation of the plurality of detonation orifices may include the plurality of detonation orifices having geometric congruence with respect to a reference element of the detonation combustor about which the plurality of detonation orifices are oriented. The term "geometric congruence" or "geometrically congruent," as used herein in relation to a plurality of detonation orifices, refers to a perimetric orientation of a geometric perimeter defined collectively by an arrangement of the plurality of detonation orifices that coincides with a geometric shape of a reference element of the detonation combustor about which the plurality of detonation orifices are oriented.

By way of example, a circular geometric perimeter defined collectively by a plurality of detonation orifices has geometric congruence with a cylindrical annular midplane, as well as a circular meridian line of the cylindrical annular midplane. Additionally, a circular geometric perimeter defined by a plurality of detonation orifices has geometric congruence with one or more detonation chamber walls that define a detonation chamber that has a cylindrical configuration and/or with one or more detonation manifold walls that define a detonation manifold that has a cylindrical configuration. As another example, a hexagonal geometric perimeter defined collectively by a plurality of detonation orifices has geometric congruence with an annular midplane that has a hexagonal prism shape, as well as a hexagonal meridian line of the hexagonal annular midplane. Additionally, a hexagonal geometric perimeter defined by a plurality of detonation orifices has geometric congruence with one or more detonation chamber walls that define a detonation chamber that has a hexagonal prism shape and/or with one or more detonation manifold walls that define a detonation manifold that has a hexagonal prism shape.

In some embodiments, the plurality of detonation orifices may be uniformly spaced about a geometric perimeter defined collectively by the plurality of detonation orifices. Such uniform spacing may depend at least in part on the configuration of the geometric perimeter defined collectively by the plurality of detonation orifices. In some embodiments, the plurality of detonation orifices may have non-uniform spacing about a geometric perimeter defined collectively by the plurality of detonation orifices. Additionally, or in the alternative, the plurality of detonation orifices may have uniform spacing with respect to one or more regions or portions of the geometric perimeter defined collectively by the plurality of detonation orifices. For example, the spacing of the detonation orifices may differ as between a first region and a second region or portion of the geometric perimeter defined collectively by the plurality of detonation orifices.

The term "uniform spacing" or "uniformly spaced," as used herein in relation to a plurality of detonation orifices, refers to detonation orifices that are uniformly spaced about a geometric perimeter defined collectively by the plurality of detonation orifices, including detonation orifices that have equidistant spacing and/or proportionate spacing about such geometric perimeter. The term "equidistant spacing" or "equidistantly spaced," as used herein in relation to a plurality of detonation orifices, refers to a plurality of detonation orifices that have an equal perimetric distance between adjacent detonation orifices. By way of example, a plurality of detonation orifices that have equidistant spacing may collectively define a geometric perimeter that has a circular shape with equal circumferential spacing between the respective ones of the plurality of detonation orifices. The term "proportionate spacing" or "proportionately spaced," as used herein in relation to a plurality of detonation orifices, refers to a plurality of detonation orifices that have a perimetric distance between adjacent detonation orifices that is proportionate to a distance between the respective ones of the plurality of detonation orifices and a reference element of the detonation combustor about which the plurality of detonation orifices are oriented. By way of example, a plurality of detonation orifices that have equidistant spacing may collectively define a geometric perimeter that has an elliptical shape with an arc length between the respective ones of the plurality of detonation orifices that is proportional to the radius of the geometric perimeter at a respective location between the respective ones of the plurality of detonation orifices.

As used herein, the term "combustion" refers to the occurrence of exothermic chemical reactions between a fuel and an oxidant, producing combustion products and heat by conversion of chemical species. Heat and kinetic energy generated by combustion may be utilized by an engine to provide thrust. Generally, combustion may be performed in one or both of two modes: deflagration and detonation. As used herein, the term "deflagration" or "deflagration combustion" refers to combustion that can be described thermodynamically as approximately isobaric. During a deflagration combustion process, typically, the pressure of the combustion products drops slightly, and the specific volume of the combustion products expends significantly, generating a combustion wave that has a subsonic velocity. For example, a combustion wave generated by a deflagration combustion process may have a velocity on the order of several meters per second (m/s), such as from about 10 m/s to about 200 m/s. As used herein, the term "detonation" or "detonation combustion" refers to combustion that can be described thermodynamically as approximately isochoric. During a detonation combustion process, typically, the pressure and temperature of the combustion products increase abruptly, and the specific volume decreases slightly, generating a supersonic shock wave that closely precedes a combustion wave that also has a supersonic velocity. For example, a combustion wave generated by a detonation combustion process may have a velocity on the order of several kilometers per second (km/s), such as from about 1 km/s to about 6 km/s.

Detonation generally provides a faster heat release, a lower entropy increase, and a greater thermal efficiency, as compared to deflagration. Exemplary detonation combustion processes may provide a pressure increase on the order of a multiple of from about 5 to about 20. In further contrast with deflagration, detonation may propagate in a lean fuel mixture that results in relatively low NOx emissions. Detonation combustion has a higher thermodynamic efficiency than deflagration combustion, which translates to significantly improved specific impulse and/or a specific fuel consumption. In some embodiments, a gas turbine engine that utilizes detonation combustion may have a reduced number of compressor stages and/or a reduced compressor pressure demands attributable, for example, to the ability for detonation combustion to provide a relatively large effective thrust at a relatively low overall compression ratio. Additionally, or in the alternative, detonation combustion may allow for engines with a higher thrust-to-weight ratio, which may allow for smaller, lighter-weight engines for given duty requirements. In exemplary embodiments, the disclosed detonation combustion systems may be configured to perform rotating detonation combustion. A rotating detonation combustion process may generate shock waves respectively preceding a combustion wave that propagates annularly through a detonation region of the detonation chamber. The annularly propagating shock waves and combustion waves may transition to longitudinal waves as combustion products travel through the detonation chamber.

Figure 1B:
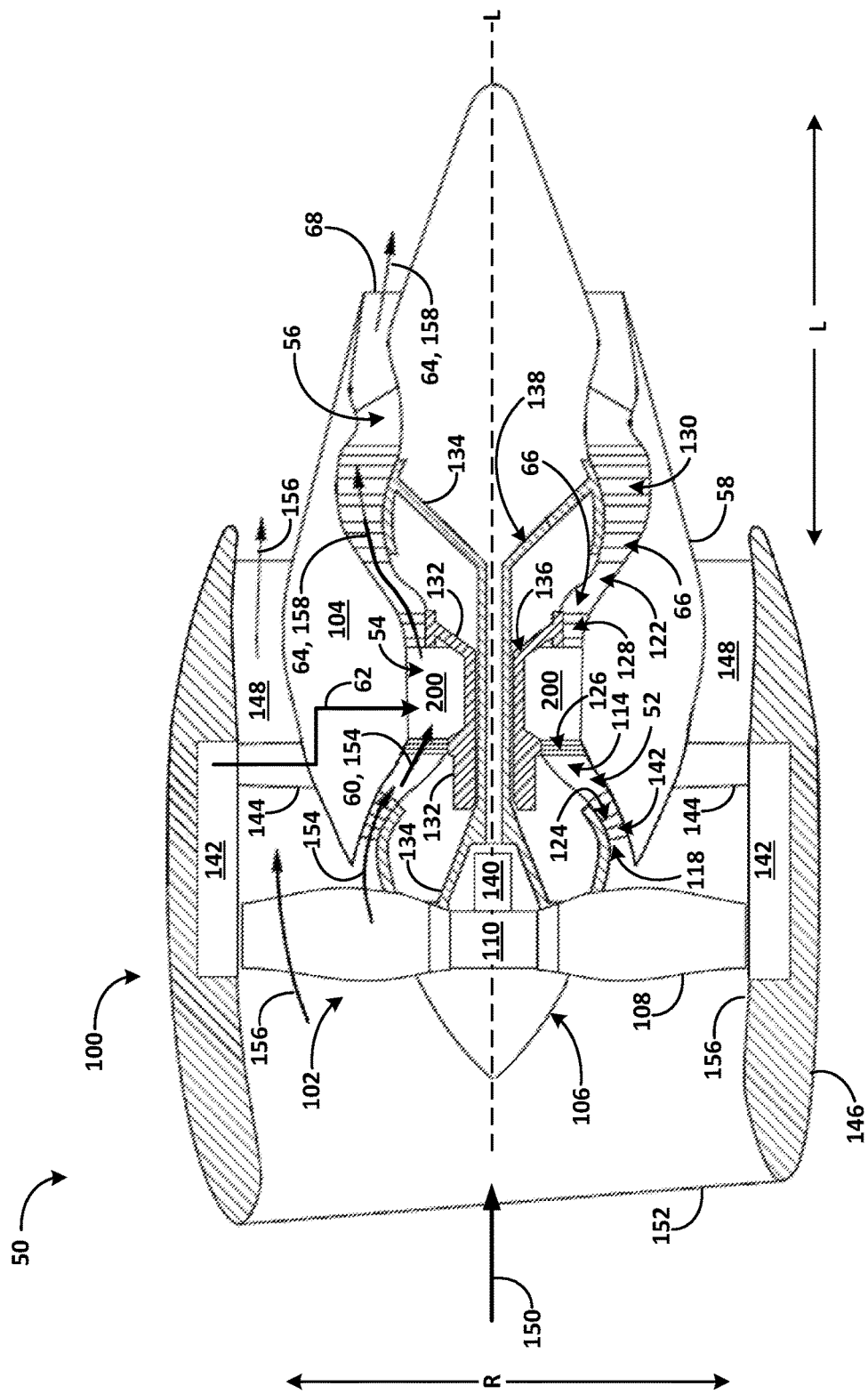
FIG. 1B shows a schematic cross-sectional view of an exemplary turbine engine that includes a detonation combustion system.

Exemplary embodiments of the present disclosure will now be described in further detail. Referring to FIGS. 1A and 1B, exemplary engines 50 that include a detonation combustion system 200 will be described. The engine 50 depicted in FIG. 1A may be any engine 50 that includes a detonation combustion system 200, such as a turbine engine, a rocket engine, a ramjet, or a combination thereof, such as a turbo-rocket engine, a turbo-ramjet, or a rocket-ramjet. By way of example, FIG. 1B shows an exemplary turbine engine 100 that includes a detonation combustion system 200. An exemplary engine 50, such as a turbine engine 100 may be mounted to an aircraft, such as in an under-wing configuration or tail-mounted configuration. The turbine engine 100 shown in FIG. 1B is provided by way of example and not to be limiting, and the subject matter of the present disclosure may be implemented with other suitable types of engines 50, including other suitable turbine engines 100.

As shown, for example, in FIG. 1A, an exemplary engine 50 may include, in serial flow relationship, an inlet section 52, a combustor section 54, and an outlet section 56. The engine 50 may include an engine case 58 that contains and/or defines at least a portion of the inlet section 52, the combustor section 54, and/or the outlet section 56. The inlet section 52 may generally guide a stream of oxidizer 60 such as air or gases to the combustor section 54. The inlet section 52 may compress the oxidizer 60 prior to entering the combustor section 54. For example, the inlet section 52 may define a decreasing cross-sectional area leading downstream to the combustor section 54. At least a portion of the overall flow of oxidizer 60 may be mixed with a fuel 62 and may react in a combustion process to generate combustion products 64.

Exemplary oxidizers 60 may include air, oxygen, hydrogen peroxide, nitrogen tetroxide (dinitrogen tetroxide), nitric acid, anhydrous nitric oxide, as well as combinations of these. In some embodiments, a fuel 62 and an oxidizer 60 may be combined to provide a hypergolic propellant. As used herein, the term "hypergolic propellant" refers to a fuel 62 and an oxidizer 60 that spontaneously ignite when they come into contact with one another. By way of example, a hypergolic propellant may include a fuel 62 such as hydrazine, monomethyl hydrazine, unsymmetrical dimethylhydrazine, triethylamine, xylidine, triethyl borane, or triethylaluminium, as well as combinations of these. Additionally, or in the alternative, a hypergolic propellant may include an oxidizer 60 such as air, oxygen, hydrogen peroxide, nitrogen tetroxide (dinitrogen tetroxide), nitric acid, anhydrous nitric oxide, as well as combinations of these.

The combustor section 54 may include a detonation combustion system 200 configured according to the present disclosure. The detonation combustion system 200 may include a detonation combustor 202 configured to perform detonation combustion. In some embodiments, the detonation combustor 202 may be configured to perform both detonation combustion and deflagration combustion. For example, the detonation combustor 202 may transition from deflagration to detonation. Additionally, or in the alternative, the engine 50 may operate utilizing deflagration combustion to generate thrust prior to transitioning to detonation. Combustion products 64 from the combustor section 54 flow downstream to the outlet section 56. In some embodiments, the combustion products 64 may flow through a turbine section 66 prior to entering the outlet section 56. The turbine section 66 may include one or more turbine stages. In some embodiments, the turbine section 66 may include a high-pressure turbine and/or a low pressure turbine as described herein. The turbine section 66 may be disposed downstream of the combustor section 54. The turbine section 66 may be located between the combustor section 54 and the outlet section 56. The outlet section 56 may generally define an increasing cross sectional area leading downstream from the combustor section 54 and/or downstream from the turbine section 66. In some embodiments, the turbine sections 66 may define a portion of the outlet section 56. Additionally, or in the alternative, the outlet section 56 may include an outlet nozzle 68, or the like. Expansion of the combustion products 64 generally provides thrust that may be utilized as a direct power output in the form of thrust, and/or to generate mechanical energy, for example, by rotation of the turbine section 66.

As shown in FIG. 1B, an engine 50 configured as a turbine engine 100 may include a fan section 102 and a core engine 104 disposed downstream from the fan section 102. The fan section 102 may include a fan 106 with any suitable configuration, such as a variable pitch, single stage configuration. The fan 106 may include a plurality of fan blades 108 coupled to a fan disk 110 in a spaced apart manner. The fan blades 108 may extend outwardly from the fan disk 110 generally along a radial direction. The core engine 104 may be coupled directly or indirectly to the fan section 102 to provide torque for driving the fan section 102.

The core engine 104 may include an engine case 58 that encases one or more portions of the core engine 104, including a compressor section 114, a combustor section 54, and a turbine section 66. The engine case 58 may define a core engine-inlet 118, an outlet nozzle 68, and a core air flowpath 122 therebetween. The core air flowpath 122 may pass through the compressor section 114, the combustor section 54, and the turbine section 66, in serial flow relationship. The compressor section 114 may include one or more compressors, such as a first, booster or low pressure (LP) compressor 124 and/or a second, high pressure (HP) compressor 126. The one or more compressors may respectively include one or more compressor stages. By way of example, the compressor section 114, the LP compressor 124, and/or the HP compressor 126, may respectively have from 1 to 16 compressor stages, such as from 1 to 12 stages, such as from 1 to 10 stages, such as from 1 to 8 stages, such as from 1 to 6 stages, or such as from 1 to 4 stages. The turbine section 66 may include a first, high pressure (HP) turbine 128 and a second, low pressure (LP) turbine 130. The compressor section 114, combustor section 54, turbine section 66, and outlet nozzle 68 may be arranged in serial flow relationship and may respectively define a portion of the core air flowpath 122 through the core engine 104. In some embodiments, the inlet section 52 (FIG. 1A) may include at least a portion of the core engine-inlet 118 and/or at least a portion of the compressor section 114. In some embodiments, the outlet section 56 (FIG. 1A) may include at least a portion of the outlet nozzle 68 and/or at least a portion of the turbine section 66.

The core engine 104 and the fan section 102 may be coupled to a shaft driven by the core engine 104. By way of example, as shown in FIG. 1B, the core engine 104 may include a high pressure (HP) shaft 132 and a low pressure (LP) shaft 134. The HP shaft 132 may drivingly connect the HP turbine 128 to the HP compressor 126, and the LP shaft 134 may drivingly connect the LP turbine 130 to the LP compressor 124. In other embodiments, a turbine engine 100 may have three shafts, such as in the case of a turbine engine 100 that includes an intermediate pressure turbine. A shaft of the core engine 104, together with a rotating portion of the core engine 104, may sometimes be referred to as a "spool." The HP shaft 132, a rotating portion of the HP compressor 126 coupled to the HP shaft 132, and a rotating portion of the HP turbine 128 coupled to the HP shaft 132, may be collectively referred to as a high pressure (HP) spool 136. The LP shaft 134, a rotating portion of the LP compressor 124 coupled to the LP shaft 134, and a rotating portion of the LP turbine 130 coupled to the LP shaft 134, may be collectively referred to as low pressure (LP) spool 138.

In some embodiments, the fan section 102 may be coupled directly to a shaft of the core engine 104, such as directly to an LP shaft 134. Alternatively, as shown in FIG. 1B, the fan section 102 and the core engine 104 may be coupled to one another by way of a power gearbox 140, such as a planetary reduction gearbox, an epicyclical gearbox, or the like. For example, the power gearbox 140 may couple the LP shaft 134 to the fan 106, such as to the fan disk 110 of the fan section 102. The power gearbox 140 may include a plurality of gears for stepping down the rotational speed of the LP shaft 134 to a more efficient rotational speed for the fan section 102.

Still referring to FIG. 1B, the fan section 102 of the turbine engine 100 may include a fan case 142 that at least partially surrounds the fan 106 and/or the plurality of fan blades 108. The fan case 142 may be supported by the core engine 104, for example, by a plurality of outlet guide vanes 144 circumferentially spaced and extending substantially radially therebetween. The turbine engine 100 may include a nacelle 146. The nacelle 146 may be secured to the fan case 142. The nacelle 146 may include one or more sections that at least partially surround the fan section 102, the fan case 142, and/or the core engine 104. For example, the nacelle 146 may include a nose cowl, a fan cowl, an engine cowl, a thrust reverser, and so forth. The fan case 142 and/or an inward portion of the nacelle 146 may circumferentially surround an outward portion of the core engine 104. The fan case 142 and/or the inward portion of the nacelle 146 may define a bypass passage 148. The bypass passage 148 may be disposed annularly between an outward portion of the core engine 104 and the fan case 142 and/or inward portion of the nacelle 146 surrounding the outward portion of the core engine 104.

During operation of the turbine engine 100, an inlet airflow 150 enters the turbine engine 100 through an inlet 152 defined by the nacelle 146, such as a nose cowl of the nacelle 146. In some embodiments, the inlet section 52 (FIG. 1A) may include at least a portion of the inlet 152, at least a portion of the nacelle 146, and/or at least a portion of the fan case 142. The inlet airflow 150 passes across the fan blades 108. The inlet airflow 150 splits into a core airflow 154 that flows into and through the core air flowpath 122 of the core engine 104 and a bypass airflow 156 that flows through the bypass passage 148. The core airflow 154 is compressed by the compressor section 114. Pressurized air from the compressor section 114 flows downstream to the combustor section 54 where fuel is introduced to generate combustion gases 158. The combustion gases 158 exit the combustor section 54 and flow through the turbine section 66, generating torque and/or thrust that rotates the compressor section to support combustion while also rotating the fan section 102. Rotation of the fan section 102 causes the bypass airflow 156 to flow through the bypass passage 148, generating propulsive thrust. Additional thrust is generated by the core airflow exiting the outlet nozzle 68.

In some exemplary embodiments, the turbine engine 100 may be a relatively large power class turbine engine 100 that may generate a relatively large amount of thrust. For example, the turbine engine 100 may be configured to generate from about 300 kilonewtons (kN) of thrust to about 700 kN of thrust, for example, at a rated speed and/or at a cruising speed, such as from about 300 kN to about 500 kN of thrust, such as from about 500 kN to about 620 kN of thrust, or such as from about 620 kN to about 700 kN of thrust. In other embodiments, the turbine engine 100 may be configured to generate from about 10 kN of thrust to about 300 kN of thrust, such as from about 10 kN of thrust to about 50 kN of thrust, such as from about 50 kN of thrust to about 150 kN of thrust, such as from about 100 kN of thrust to about 300 kN of thrust, such as from about 100 kN of thrust to about 200 kN of thrust. The various features and attributes of the turbine engine 100 described with reference to FIG. 1B are provided by way of example only and not to be limiting. In fact, the present disclosure may be implemented with respect to any desired turbine engine, including those with attributes or features that differ in one or more respects from the turbine engine 100 described herein.

Figure 2:
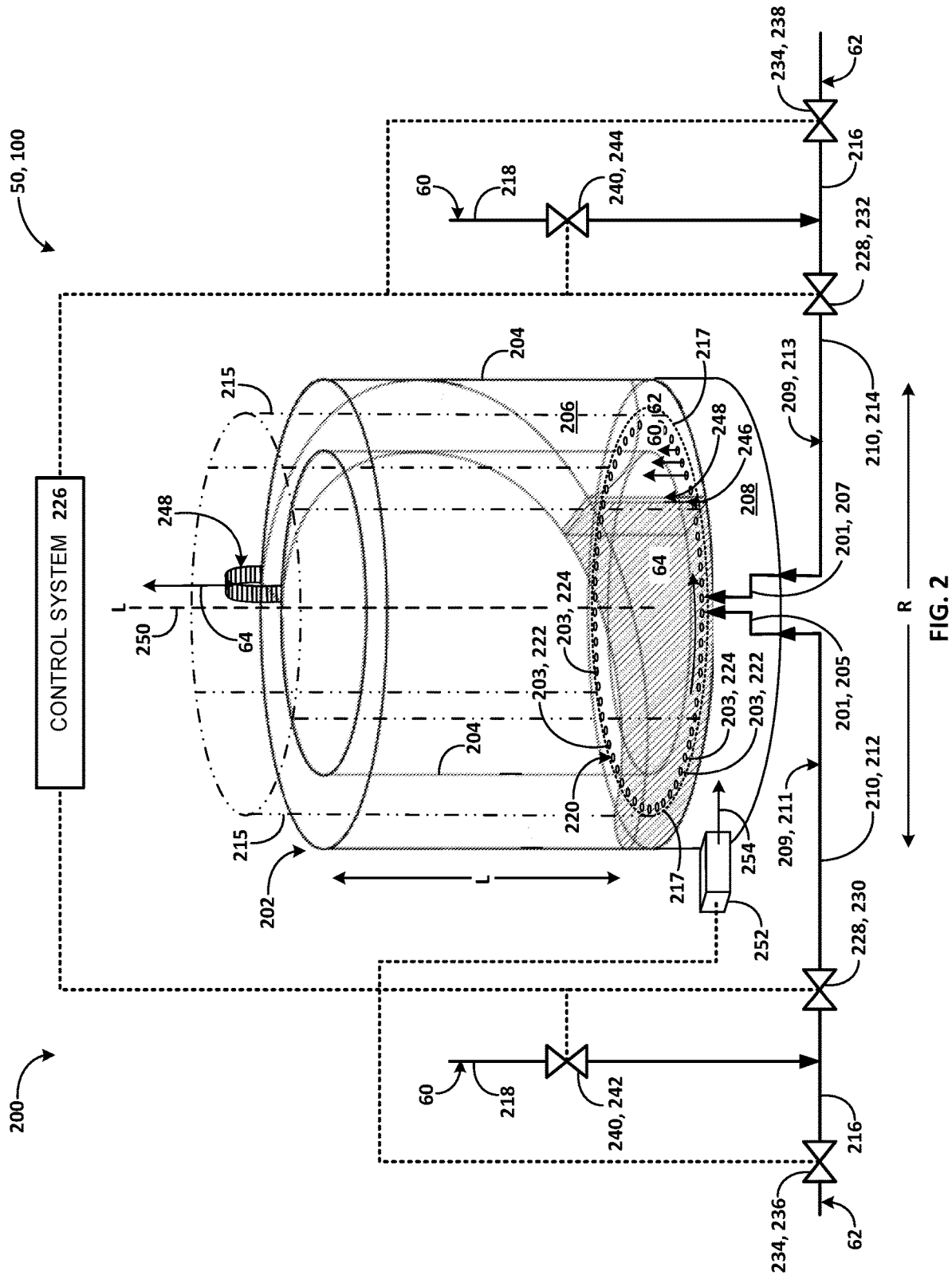
FIG. 2 shows a schematic perspective view of an exemplary detonation combustion system.

Now referring to FIG. 2, exemplary detonation combustion systems 200 are further described. As shown, a detonation combustion system 200 may include a detonation combustor 202. The detonation combustor 202 may include one or more detonation chamber walls 204 defining a detonation chamber 206 within which detonation combustion may take place during operation of the detonation combustion system 200. The detonation combustion may include pulsed detonation combustion, continuous detonation combustion, and/or rotating detonation combustion. The detonation chamber 206 may be oriented with respect to a longitudinal axis 250. The detonation chamber 206 may circumferentially surround the longitudinal axis 250. The detonation chamber 206 may have an annular configuration, such as an elliptical annular configuration, a cylindrical annular configuration, or a polyhedral annular configuration. The detonation chamber may include an outward detonation chamber wall 204 and an inward detonation chamber wall 204. The outward an inward detonation chamber walls 204 may be oriented coaxially with respect to the longitudinal axis 250. Other configurations are also contemplated. For example, a detonation chamber 206 may have a configuration that includes a cylindrical configuration, a polyhedral configuration, an annular polyhedral configuration, a frustoconical configuration, an annular frustoconical configuration, a polygonal configuration, or an annular polygonal configuration, as well as combinations of these.

The detonation combustion system 200 may include a detonation manifold 208 configured to supply detonation fluid 209 to the detonation chamber 206, such as fuel 62 and/or oxidizer 60. The detonation manifold 208 may be oriented with respect to the longitudinal axis 250. The detonation manifold 208 may have a shape generally corresponding to the shape of the detonation chamber 206. In some embodiments, the detonation manifold 208 may have an annular configuration, such an elliptical annular configuration, a circular annular configuration, or a polygonal annular configuration. The fuel 62 and oxidizer 60 may be mixed within the detonation manifold 208. Additionally, or in the alternative, the fuel 62 and oxidizer 60 may be mixed upstream from the detonation manifold 208 and/or within the detonation chamber 206. The detonation manifold 208 may define a portion of a detonation chamber wall 204. Additionally, or in the alternative, a detonation manifold 208 may be coupled to one or more detonation chamber walls 204. In some embodiments, a detonation manifold 208 may be monolithically integrated with one or more detonation chamber walls 204. In some embodiments, the one or more detonation chamber walls 204 and the detonation manifold 208 may define a single monolithic component. Additionally, or in the alternative, the detonation manifold 208 may include a plurality of components, such as a plurality of monolithic components, that may be assembled or attached to one another, such as by attachment hardware, welding, or the like.

The detonation combustion system 200 may include one or more detonation manifold supply lines 210 in fluid communication with the detonation manifold 208. The one or more detonation manifold supply lines 210 may be configured to supply detonation fluid 209 to the detonation manifold 208, such as fuel 62 and/or oxidizer 60. The one or more detonation manifold supply lines 210 may be coupled to the detonation manifold 208. Additionally, or in the alternative, the one or more detonation manifold supply lines 210 may be defined at least in part by the detonation manifold 208, such as by a monolithic structure of the detonation manifold 208. As shown in FIG. 2, a detonation combustion system 200 may include a plurality of detonation manifold supply lines 210, such as a first detonation manifold supply line 212 and a second detonation manifold supply line 214. The first detonation manifold supply line 212 may be configured to supply a first detonation fluid 211 to the detonation manifold 208. The second detonation manifold supply line 214 may be configured to supply a second detonation fluid 213 to the detonation manifold 208. In addition, or in the alternative to the one or more detonation manifold supply lines 210, a detonation combustion system 200 may include one or more fuel supply lines 216 and/or one or more oxidizer supply lines 218. At least one fuel supply line 216 and/or at least one oxidizer supply line 218 may be in fluid communication with a respective detonation manifold supply line 210. At least one fuel supply line 216 and/or at least one oxidizer supply line 218 may be coupled to a respective detonation manifold supply line 210. Additionally, or in the alternative, the at least one fuel supply line 216 and/or the at least one oxidizer supply line 218 may define at least a portion of the respective detonation manifold supply line 210. The first detonation manifold supply line 212 may be configured to supply a fuel 62 and/or an oxidizer 60 in a liquid phase and/or a gas phase. The second detonation manifold supply line 214 may be configured to supply a fuel 62 and/or an oxidizer 60 in a liquid phase and/or a gas phase. Additionally, or in the alternative, in some embodiments, the first detonation manifold supply line 212 and/or the second detonation manifold supply line 214 may be configured to supply a coolant to the detonation manifold 208. The coolant may include water, nitrogen, a refrigerant, or an oil, as well as combinations of these. The coolant may be supplied to the detonation manifold 208 during operation of the detonation combustor 202. Additionally, or in the alternative, the coolant may be supplied to the detonation manifold 208 to precondition the detonation manifold and/or the detonation chamber 206 to a specified temperature.

In some embodiments, the first detonation fluid 211 may include a first fuel 62 and/or a first oxidizer 60. The second detonation fluid 213 may include a second fuel 62 and/or a second oxidizer 60. The first detonation fluid 211 and the second detonation fluid 213 may be the same or different from one another, for example, during a specified operating state of the detonation combustion system 200. For example, the first detonation fluid 211 may include a first fuel 62 and the second detonation fluid 213 may include a second fuel 62, and the first and second fuel 62 may have a different composition and/or a different concentration from one another. Additionally, or in the alternative, the first detonation fluid 211 may include a first oxidizer 60 and the second detonation fluid 213 may include a second oxidizer 60, and the first and second oxidizer 60 may have a different composition and/or a different concentration from one another. Additionally, or in the alternative, the first detonation fluid 211 and the second detonation fluid 213 may include the same fuel 62 and/or the same oxidizer 60 as one another, for example, during a specified operating state of the detonation combustion system 200. When the first detonation fluid 211 and the second detonation fluid 213 include the same fuel 62 and/or the same oxidizer 60 as one another for example, the concentration of the fuel 62 and/or oxidizer 60 may be the same or different as between the first detonation fluid 211 and the second detonation fluid 213.

The detonation manifold 208 may include a plurality of detonation orifices 220 through which detonation fluid 209 such as fuel 62 and/or oxidizer 60 may be supplied to the detonation chamber 206. The plurality of detonation orifices 220 may be defined at least in part by a structure of the detonation manifold 208, such as by a monolithic structure of the detonation manifold 208. The plurality of detonation orifices 220 may be configured to provide fluid communication between corresponding detonation manifold supply lines 210 and the detonation chamber 206. One or more detonation fluids 209, such as one or more types of fuel 62 and/or one or more oxidizers 60, may mix with one another within the detonation manifold 208 and/or upstream from the detonation manifold 208, such as within the respective detonation manifold supply lines 210. Additionally, or in the alternative, one or more detonation fluids 209 may mix with one another within the detonation chamber 206.

In some embodiments, a detonation manifold 208 may include a plurality of detonation fluid pathways 201 respectively configured to supply a corresponding detonation fluid 209 to the detonation chamber 206. The respective detonation fluid pathways 201 may be defined by a structure of the detonation manifold 208, such as a monolithic structure of the detonation manifold 208. Respective ones of the plurality of detonation fluid pathways 201 may be configured to provide fluid communication between one or more detonation manifold supply lines 210 and the detonation chamber 206 through a plurality of detonation orifices 220 corresponding to a respective one of a plurality of detonation orifice groups 203. The respective detonation fluid pathways 201 may be fluidly isolated from one another. The respective detonation fluid pathways 201 may be respectively configured to provide a respectively different detonation fluid 209 to the detonation chamber 206, and/or to provide one or more detonation fluids 209 to the detonation chamber 206 with one or more respectively different fluid dynamics, such as volumetric flow rate, flow velocity, pressure, and/or pressure drop across the plurality of detonation orifices 220 in the respective detonation orifice group 203.

For example, as shown in FIG. 2, a detonation manifold 208 may include a first detonation fluid pathway 205 in fluid communication with the detonation chamber 206 through a first detonation orifice group 222 that includes a plurality of first detonation orifices 220. Additionally, or in the alternative, the detonation manifold 208 may include a second detonation fluid pathway 207 in fluid communication with the detonation chamber 206 through a second detonation orifice group 224 that includes a plurality of second detonation orifices 220. The first detonation fluid pathway 205 may be configured to supply a first detonation fluid 211 to the detonation chamber 206. The first detonation fluid pathway 205 may include, and/or may be in fluid communication with, the first detonation manifold supply line 212. The second detonation fluid pathway 207 may be configured to supply a second detonation fluid 213 to the detonation chamber 206. The second detonation fluid pathway 207 may include, and/or may be in fluid communication with, the second detonation manifold supply line 214. In some embodiments, the first detonation fluid pathway 205 and the second detonation fluid pathway 207 may be respectively defined by a monolithic structure of the detonation manifold 208, such as by a single monolithic component defining the detonation manifold 208. Additionally, or in the alternative, the first detonation fluid pathway 205 may be defined by a first component, such as a first monolithic component, and the second detonation fluid pathway 207 may be defined by a second component, such as a second monolithic component. The first monolithic component and the second monolithic component may be assembled or attached to one another, such as by attachment hardware, welding, or the like.

In some embodiments, one or more of a plurality of detonation fluid pathways 201 may be utilized separately or concurrently, for example, depending on an operating state of the detonation combustion system 200. For example, the first detonation fluid pathway 205 may be utilized during a first operating state to supply the first detonation fluid 211 to the detonation chamber 206, such as through the plurality of first detonation orifices 220 in the first detonation orifice group 222. Additionally, or in the alternative, the second detonation fluid pathway 207 may be utilized during a second operating state to supply the second detonation fluid 213 to the detonation chamber 206, such as through the plurality of second detonation orifices 220 in the second detonation orifice group 224. Additionally, or in the alternative, the first detonation fluid pathway 205 and the second detonation fluid pathway 207 may be utilized concurrently, such as during a third operating state.

Additionally, or in the alternative, in some embodiments, the first detonation fluid pathway 205 may be configured to supply the first detonation fluid 211 to the detonation chamber 206 through the plurality of detonation orifices 220 in the first detonation orifice group 222 at a first flow rate, and the second detonation fluid pathway 207 may be configured to supply the second detonation fluid 213 to the detonation chamber 206 through the plurality of detonation orifices 220 in the second detonation orifice group 224 at a second flow rate. The first flow rate and the second flow rate may be the same or different from one another, for example, during a specified operating state of the detonation combustion system 200. Additionally, or in the alternative, in some embodiments, the first detonation fluid pathway 205 may be configured to supply the first detonation fluid 211 to the detonation chamber 206 with a first pressure drop across the first detonation orifice group 222, and the second detonation fluid pathway 207 may be configured to supply the second detonation fluid to 213 the detonation chamber 206 with a second pressure drop across the plurality of second detonation orifices 224. The first pressure drop and the second pressure drop may be the same or different from one another, for example, during a specified operating state of the detonation combustion system 200.

The detonation combustion system 200 may include a control system 226 configured to control operation of the detonation combustor 202. The detonation combustion system 200 may include one or more control valves configured to control a flow of detonation fluid 209, such as fuel 62 and/or oxidizer 60, to the detonation manifold 208, such as a flow of detonation fluid 209 to the respective detonation fluid pathways 201. The one or more control valves may be opened, closed, and/or modulated based at least in part on control commands generated by the control system 226. In some embodiments, the detonation combustion system 200 may include one or more detonation manifold supply valves 228 configured to control a flow of detonation fluid 209, such as fuel 62 and/or oxidizer 60, to the detonation manifold 208, such as a flow of detonation fluid 209 to the respective detonation fluid pathways 201. As shown in FIG. 2, the detonation combustion system 200 may include a first detonation manifold supply valve 230 configured to control a flow of detonation fluid 209 to the first detonation fluid pathway 205, and a second detonation manifold supply valve 232 configured to control a flow of detonation fluid 209 to the second detonation fluid pathway 207.

Additionally, or in the alternative, the detonation combustion system 200 may include one or more fuel supply valves 234 configured to control a flow of fuel 62 to the one or more detonation manifold supply lines 210 and/or to the respective detonation fluid pathways 201. As shown in FIG. 2, the detonation combustion system 200 may include a first fuel supply valve 236 configured to control a flow of fuel 62 to the first detonation fluid pathway 205, and a second fuel supply valve 238 configured to control a flow of fuel 62 to the second detonation fluid pathway 207. Additionally, or in the alternative, the detonation combustion system 200 may include one or more oxidizer supply valves 240 configured to control a flow of oxidizer 60 to the one or more detonation manifold supply lines 210 and/or to the respective detonation fluid pathways 201. As shown in FIG. 2, the detonation combustion system 200 may include a first oxidizer supply valve 242 configured to control a flow of oxidizer 60 to the first detonation fluid pathway 205, and a second oxidizer supply valve 244 configured to control a flow of oxidizer 60 to the second detonation fluid pathway 207.

As detonation fluid 209, such as fuel 62 and/or oxidizer 60, flow through the plurality of detonation orifices 220 in a respective detonation orifice group 203, detonation may occur under suitable operating conditions, generating combustion products 64. As shown in FIG. 2, a detonation wave 246 preceded by a shock wave 248 may propagate annularly through the detonation chamber 206. The shock wave 248 and corresponding detonation wave 246 may propagate in a counter-clockwise direction while combustion products 64 expand in generally three-dimensions, as shown. Alternatively, the shock wave 248 and corresponding detonation wave 246 may propagate in a clockwise direction. While one shock wave 248 and corresponding detonation wave 246 are depicted in FIG. 2 for illustrative purposes, exemplary detonation combustors 202 may be configured to continuously generate a plurality of shock waves 248 and corresponding detonation waves 246. For example, a plurality of shock waves 248 and corresponding detonation waves 246 may concurrently propagate around the annular volume of the detonation chamber 206, for example, with a circumferentially spaced relationship. While the detonation chamber 206 schematically shown in FIG. 2 has a generally cylindrical annulus shape, the detonation chamber 206 may include any shape that provides a continuous path for the shock wave 248 and corresponding detonation wave 246 to follow. By way of example, a detonation chamber 206 may include a torus shape, a trapezoidal shape, or an elliptical shape. The shock wave 248 and corresponding detonation wave 246 may envelop all or a portion of the annular perimeter defined by the detonation chamber 206.

As shown in FIG. 2, a region preceding the shock wave 248 and corresponding detonation wave 246 may include a mixture of fuel 62 and oxidizer 60 at a concentration suitable for detonation. As the mixture of fuel 62 and oxidizer 60 detonates, the shock wave 248 generated by the detonation may temporarily inhibit further fuel 62 and oxidizer 60 from entering the detonation chamber 206. The shock wave 248 and corresponding detonation wave 246 may propagate around the annular volume of the detonation chamber 206, consuming further fuel 62 and oxidizer 60. As the shock wave 248 and corresponding detonation wave 246 propagate around the annular volume, additional fuel 62 and oxidizer 60 may flow into the detonation chamber 206 generally trailing the shock wave 248 and corresponding detonation wave 246.

As the combustion products 64 expand while propagating through the detonation chamber 206, at least a portion of the shock wave 248 may propagate out of the detonation chamber 206, providing thrust. In some embodiments, the shock wave 248 may transition from a generally rotational direction of propagation to a helical or longitudinal direction of propagation as the shock waves 248 propagate through and/or out of the detonation chamber 206. In some embodiments, a longitudinal shock wave 248 may be generated that propagates through and/or out of the detonation chamber 206. The shock waves 248, such as longitudinal shock waves 248 propagating through and/or out of the detonation chamber 206 may envelop at least a portion of the circumference of the detonation chamber 206. While one longitudinal shock wave 248 is depicted in FIG. 2 for illustrative purposes, exemplary detonation combustors 202 may be configured to continuously generate a plurality of longitudinal shock waves 248. For example, a plurality of longitudinal shock waves 248 may concurrently propagate longitudinally from the detonation chamber 206, for example, with a circumferentially spaced relationship and/or at a detonation frequency. Additionally, or in the alternative, the plurality of longitudinal shock waves 248 may have an annular configuration. The shock waves 248 may propagate into one or more turbine sections 66 of the engine 50, through an outlet section 56 of the engine 50, and/or through an outlet nozzle 68 of the engine 50, generating thrust.

In some embodiments, the detonation combustor 202 may include a pre-detonator 252 configured to generate a blast wave 254 suitable to initiate detonation within the detonation chamber 206. In some embodiments, deflagration may be performed in the detonation chamber 206 prior to initiating detonation within the detonation chamber 206. For example, the detonation chamber 206 may be utilized for deflagration during specified operating conditions. Deflagration may be performed within the detonation chamber 206, by providing fuel 62 and oxidizer 60 suitable for deflagration, such as a fuel 62 and oxidizer 60 mixture that would be unsuitable for detonation.

Still referring to FIG. 2, the detonation combustor 202 may have an annular midplane 215. The annular midplane 215 may circumferentially surround the longitudinal axis 250 of the detonation chamber 206 and/or detonation manifold 208. The annular midplane 215 may be oriented parallel to the longitudinal axis 250. The annular midplane 215 may circumferentially surround the longitudinal axis 250. The annular midplane 215 may be oriented coaxially with respect to the longitudinal axis 250. For a detonation chamber 206 that has an annular configuration, as shown, for example, in FIG. 2, the annular midplane 215 may be located coaxially with respect an outward detonation chamber wall 204 and/or an inward detonation chamber wall 204, such as equidistant from the outward detonation chamber wall 204 and the inward detonation chamber wall 204. In some embodiments, the annular midplane 215 may be located equidistant between the outward detonation chamber wall 204 and the longitudinal axis 250. The annular midplane 215 may generally have a shape coinciding with the shape of the detonation chamber 206 and/or detonation manifold 208. For example, a detonation chamber 206 and/or a detonation manifold 208 that has an annular elliptical or a cylindrical configuration, as shown in FIG. 2, may have an annular midplane 215 with a corresponding annular or cylindrical shape. A detonation chamber 206 and/or a detonation manifold 208 that has an annular polyhedral configuration may have an annular midplane 215 that has a corresponding polyhedral shape. The detonation manifold 208 may be oriented coaxially with respect to the annular midplane 215 of the detonation chamber 206. The annular midplane 215 may include a meridian line 217. The meridian line 217 may be located at a longitudinal position along the longitudinal axis 250 that defines a perimeter of at least one of: the detonation chamber wall 204, a detonation manifold wall 350, and the annular midplane 215.

For example, as shown, the meridian line 217 defines a perimeter of the annular midplane 215. In some embodiments, an annular midplane 215 may include a cylindrical shape, an elliptical cylinder shape, a curvilinear shape, a polygonal shape, as well as a combination of such shapes. In some embodiments, a meridian line 217 corresponding to such annular midplane 215 may include a circular line corresponding to a perimeter of the cylindrical shape, an elliptical line corresponding to a perimeter of the elliptical cylinder shape, a curvilinear line corresponding to a perimeter of the curvilinear cylinder shape, or a polygonal line corresponding to a perimeter of the polygonal shape.

In some embodiments, the plurality of detonation orifices 220 may have a symmetric orientation and/or an axisymmetric orientation with respect to the meridian line 217. For example, the first detonation orifice group 222 and the second detonation orifice group 224 may have a symmetric and/or an axisymmetric orientation with respect to the meridian line 217. The symmetric and/or the axisymmetric orientation of the plurality of detonation orifices 220 may include the plurality of detonation orifices 220 being equidistant from the meridian line 217. In some embodiments, the meridian line 217 may intersect the plurality of detonation orifices 220. Additionally, or in the alternative, the plurality of detonation orifices 220 may have an equidistant offset from the meridian line 217. Additionally, or in the alternative, the plurality of detonation orifices 220 may be oriented coaxially with respect to the meridian line 217 at a common coaxial plane. The common coaxial plane may coincide with the annular midplane 215. For example, the common coaxial plane may be aligned with the annular midplane 215, or the common coaxial plane may be located coaxially inward or coaxially outward from the annular midplane 215.

Additionally, or in the alternative, the symmetric and/or the axisymmetric orientation of the plurality of detonation orifices 220 may include the plurality of detonation orifices 220 being equidistant from one or more detonation chamber walls 204, such as an outward detonation chamber wall 204 and/or an inward detonation chamber wall 204. For example, the first detonation orifice group 222 and the second detonation orifice group 224 may have an equidistant offset from one or more detonation chamber walls 204. Additionally, or in the alternative, the plurality of detonation orifices 220 may be oriented coaxially with respect to one or more detonation chamber walls 204 at a common coaxial plane. In addition, or in the alternative to the plurality of detonation orifices 220 having a symmetric orientation with respect to a meridian line 217 and/or with respect to one or more detonation chamber walls 204, the plurality of detonation orifices 220 may have an axisymmetric orientation with respect to the longitudinal axis 250. Additionally, or in the alternative, the plurality of detonation orifices 220 may have an equidistant offset from the longitudinal axis 250.

In some embodiments, the plurality of detonation orifices 220 may have a perimetric orientation, such as with respect to the longitudinal axis 250, that is geometrically congruent with the shape of the meridian line 217. The perimetric orientation of the plurality of detonation orifices 220 may collectively define a shape that has geometric congruence with respect to a shape of the meridian line 217. The geometric perimeter 301 defined collectively by the arrangement of the plurality of detonation orifices 220 may have an area that is equal to, greater than, or less than an area defined by the meridian line 217.

Figure 3A:
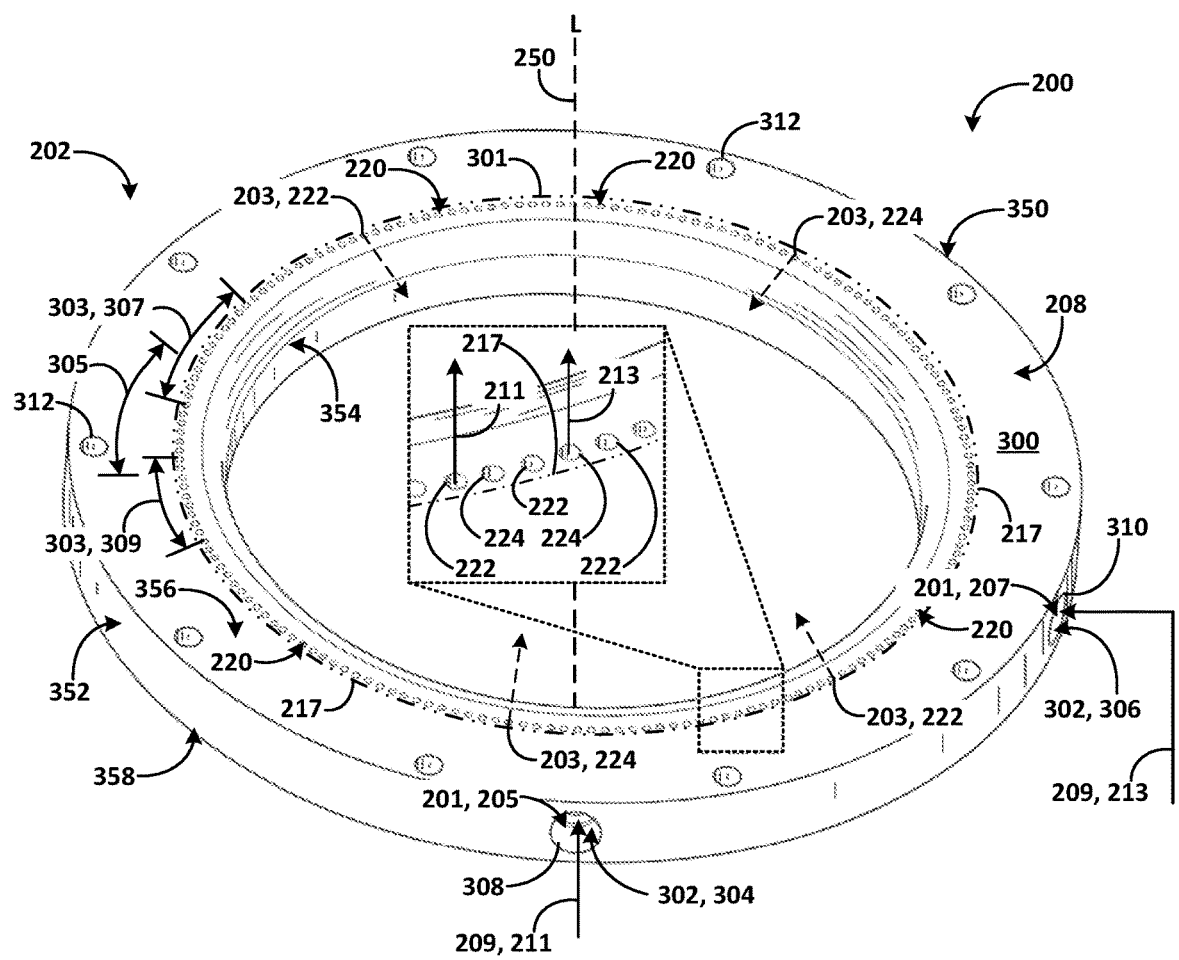
FIG. 3A shows a schematic perspective view of an exemplary detonation manifold that may be included in a detonation combustion system.
Figure 3B:
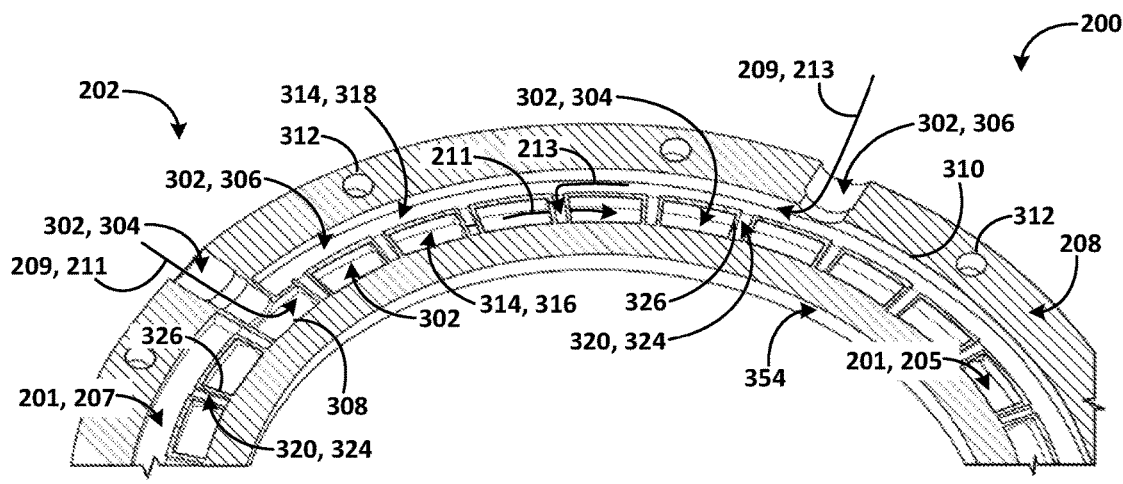
FIGS. 3B-3E respectively show schematic, cross-sectional, cutaway views of the exemplary detonation manifold of FIG. 3A.
Figure 3C:
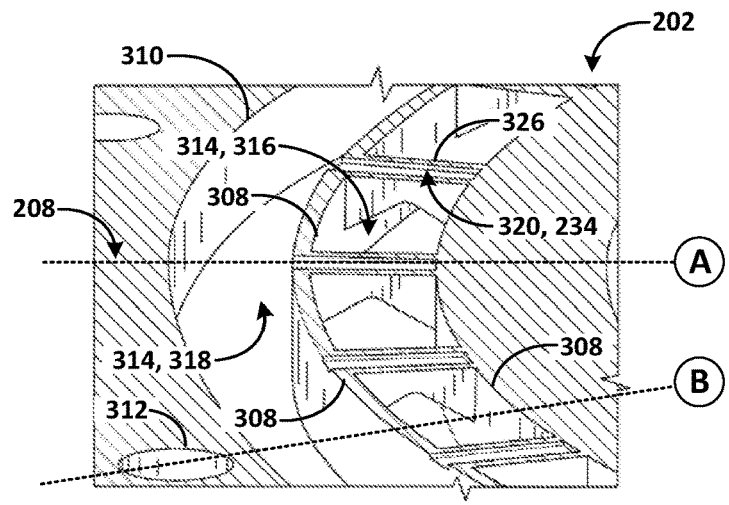
Figure 3D:
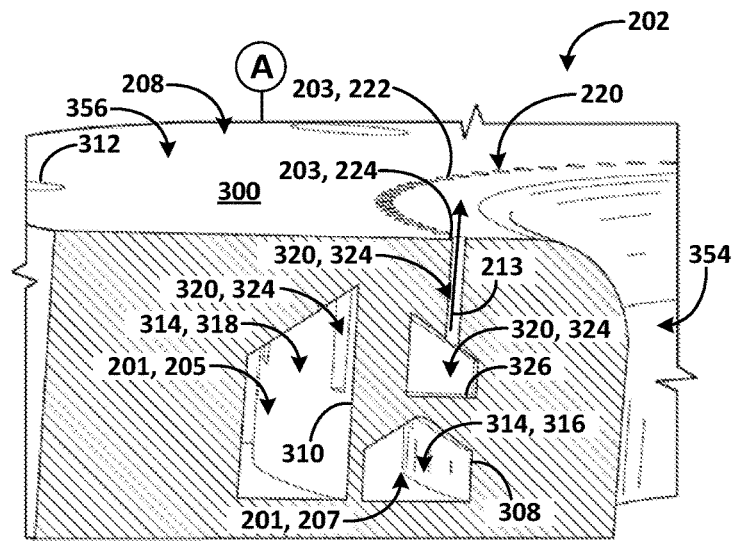
Figure 3E:
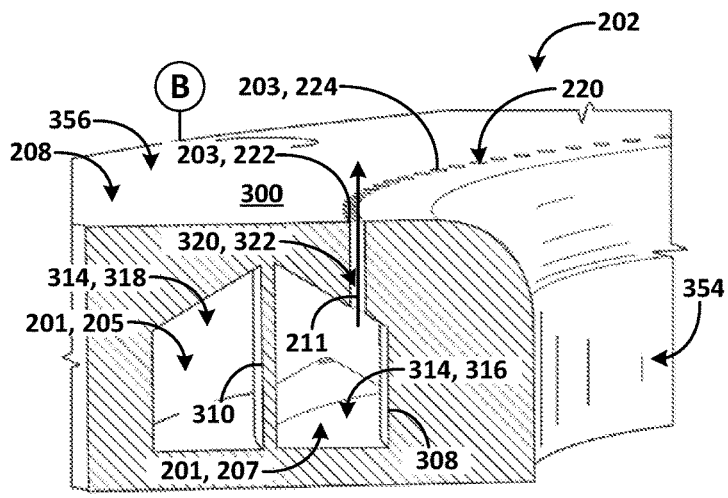
Figure 4A:
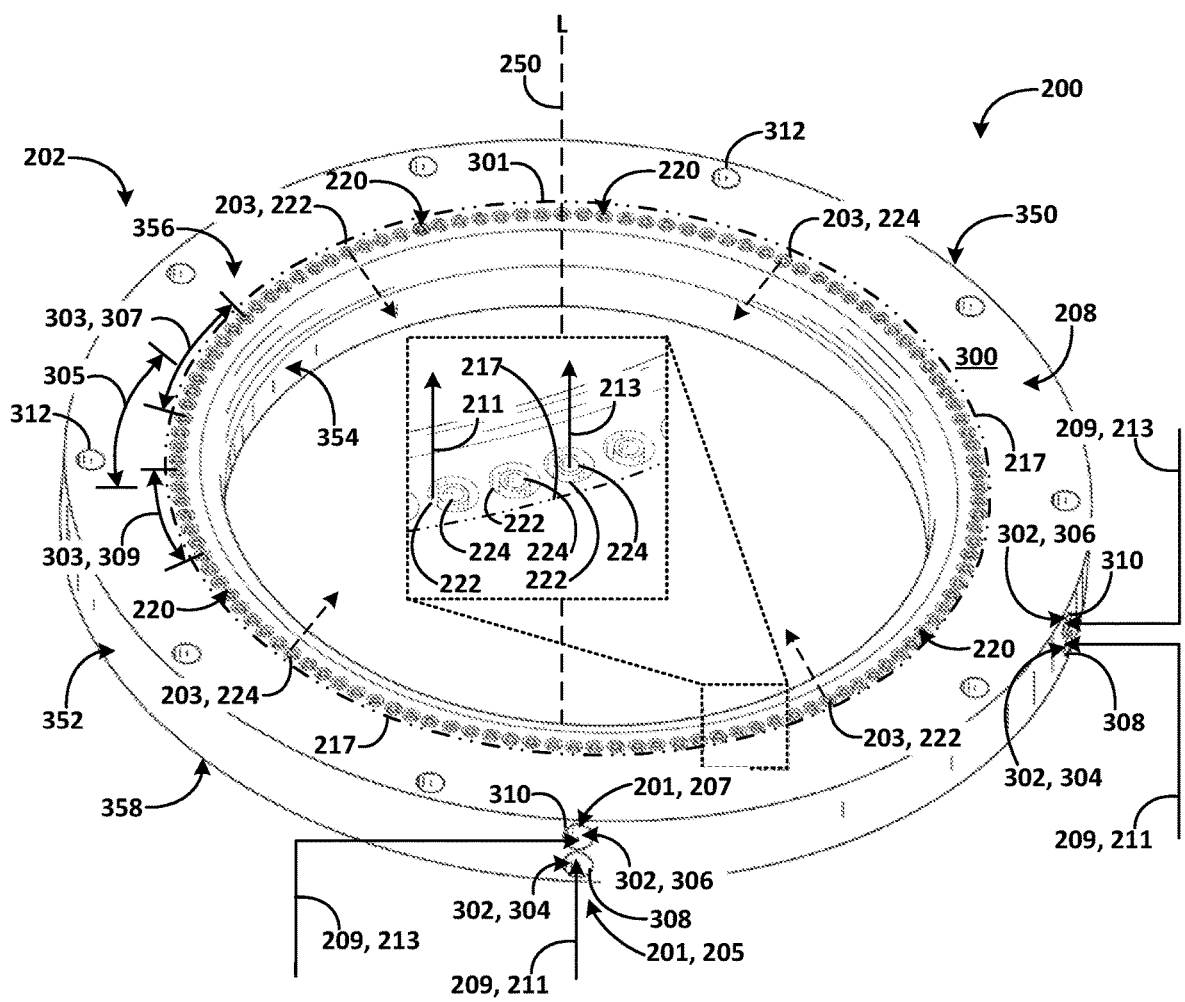
FIG. 4A shows a schematic perspective view of another exemplary detonation manifold that may be included in a detonation combustion system.
Figure 4B:
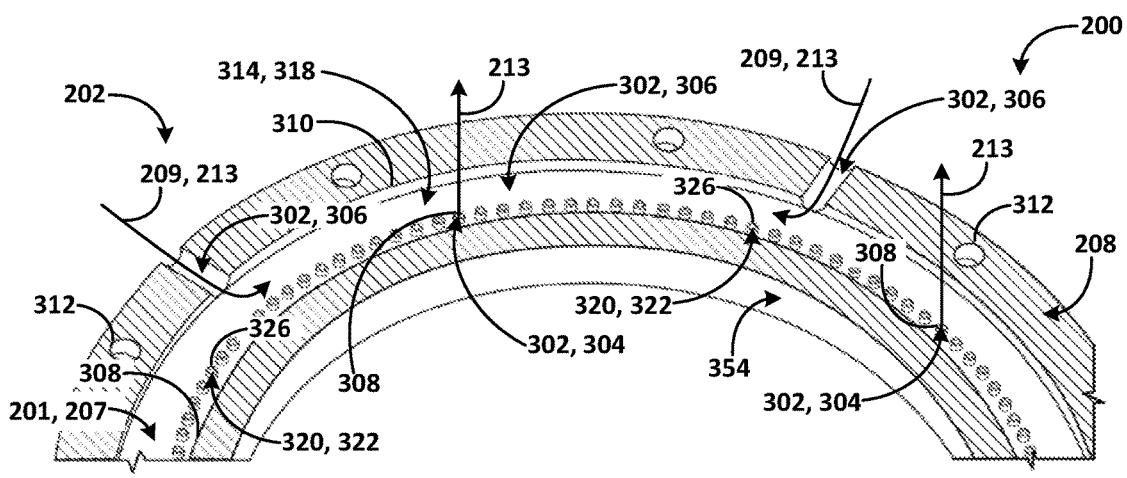
FIGS. 4B-4E respectively show schematic, cross-sectional, cutaway views of the exemplary detonation manifold of FIG. 4A.

Now referring to FIGS. 3A-3E, and FIGS. 4A-4E, exemplary detonation manifolds 208 are further described. A detonation manifold 208 may be oriented with respect to a longitudinal axis 250. As shown in FIGS. 3A and 4A, a detonation manifold 208 may have an annular configuration that circumferentially surrounds the longitudinal axis 250. For example, the detonation manifold 208 may have an annular elliptical configuration, an annular cylindrical configuration, or an annular polyhedral configuration. The detonation manifold 208 may include a plurality of detonation manifold walls 350, such as an outward annular detonation manifold wall 352, an inward annular detonation manifold wall 354, a proximal detonation manifold wall 356 located proximal to the detonation chamber 206, and a distal detonation manifold wall 358 located distal to the detonation chamber 206. The detonation manifold 208 may include a plurality of detonation orifices 220 disposed about a manifold surface 300 of the detonation manifold 208, such as a plurality of detonation orifices 220 that define a first detonation orifice group 222 and/or a plurality of detonation orifices 220 that define a second detonation orifice group 224. The detonation manifold 208 may include a plurality of manifold conduits 302 defined by a structure, such as a monolithic structure of the detonation manifold 208, or otherwise disposed within the detonation manifold 208. The plurality of manifold conduits 302 may respectively define at least a portion of a respective one of the plurality of detonation fluid pathways 201. Respective ones of the plurality of manifold conduits 302 may be configured to supply a detonation fluid 209 to a corresponding one of a plurality of detonation orifice groups 203. The respective manifold conduits 302 may be fluidly isolated from one another, for example, by a monolithic structure of the detonation manifold 208.

As shown in FIGS. 3A-3E and FIGS. 4A-4E, a detonation manifold 208 may include a first manifold conduit 304 defined by a structure, such as a monolithic structure of the detonation manifold 208, and a second manifold conduit 306 defined by a structure, such as a monolithic structure of the detonation manifold 208. The first manifold conduit 304 may be defined at least in part by one or more first conduit walls 308. The first manifold conduit 304 may define at least a portion of the first detonation fluid pathway 205. The first manifold conduit 304 may be configured to supply a first detonation fluid 211 to the detonation chamber 206 through a first detonation orifice group 222 that includes a plurality of first detonation orifices 220, for example, by way of fluid communication with the first detonation manifold supply line 212 (FIG. 2). The second manifold conduit 306 may be defined at least in part by one or more second conduit walls 310. The second manifold conduit 306 may define at least a portion of the second detonation fluid pathway 207. The second manifold conduit 306 may be configured to supply a second detonation fluid 213 to the detonation chamber 206 through a second detonation orifice group 224 that includes a plurality of second detonation orifices 220, for example, by way of fluid communication with the second detonation manifold supply line 214 (FIG. 2). The first manifold conduit 304 and the second manifold conduit 306 may be fluidly isolated from one another, for example, by the monolithic structure of the detonation manifold 208, such as by the one or more first conduit walls 308 and/or the one or more second conduit walls 310.

The manifold surface 300 that includes the plurality of detonation orifices 220 may have any desired orientation with respect to the longitudinal axis 250. Additionally, or in the alternative, the plurality of detonation orifices 220 may have any desired orientation with respect to the longitudinal axis 250, such as an orientation that differs from the orientation of the manifold surface 300. The orientation of the manifold surface 300 and/or the plurality of detonation orifices 220 may be selected based at least in part on a desired discharge direction of the detonation fluid 209 flowing into the detonation chamber 206 from the plurality of detonation orifices 220. A plurality of detonation orifice groups 203 may be commonly located on a manifold surface 300. As shown, by way of example, the manifold surface 300 that includes the plurality of detonation orifices 220 may be oriented generally perpendicular to the longitudinal axis 250, and the plurality of detonation orifices 220 may be oriented generally parallel to the longitudinal axis 250. As shown, the manifold surface 300 that includes the plurality of detonation orifices 220 may define a radial plane with respect to the longitudinal axis 250. Additionally, or in the alternative, a detonation manifold 208 may include a manifold surface 300 oriented generally parallel to the longitudinal axis 250, with a plurality of detonation orifices 220 oriented generally perpendicular to the longitudinal axis 250. Additionally, or in the alternative, a plurality of detonation orifices 220 may be located on a manifold surface 300 oriented oblique to the longitudinal axis 250. The plurality of detonation orifices 220 may be oriented parallel, perpendicular, or oblique to the longitudinal axis 250. In some embodiments, a manifold surface 300 that includes a plurality of detonation orifices 220 may have an inward-facing annular orientation with respect to the longitudinal axis 250. Additionally, or in the alternative, a manifold surface 300 that includes a plurality of detonation orifices 220 may have an outward-facing annular orientation with respect to the longitudinal axis 250. Such a manifold surface 300 with an inward-facing annular orientation or an outward-facing annular orientation may define a tangential plane with respect to the longitudinal axis 250.

As shown, for example, in FIGS. 3A and 4A, the plurality of detonation orifices 220 may have a symmetric orientation with respect to a meridian line 217 circumferentially surrounding the longitudinal axis 250. With further reference to FIG. 2, the plurality of detonation orifices 220 shown in FIGS. 3A and 4A, including the first detonation orifice group 222 and the second detonation orifice group 224, have a symmetric orientation with respect to the inward detonation chamber wall 204 and the outward detonation chamber wall 204. The detonation manifold 208 may be coupled to one or more detonation chamber walls 204 (FIG. 2) by a plurality of attachment points 312. As shown, the plurality of attachment points 312 are located coaxially with respect to the meridian line 217 and the plurality of detonation orifices 220, illustrating, for example, that the plurality of detonation orifices 220 may have a symmetric orientation with respect to one or more detonation chamber walls 204 to which the detonation manifold 208 may be coupled.

As further shown, for example, in FIGS. 3A and 4A, the plurality of detonation orifices 220 may have an axisymmetric orientation with respect to the longitudinal axis 250. As shown, the plurality of detonation orifices 220 may be equidistant from the meridian line 217. In some embodiments, the meridian line 217 may intersect the plurality of detonation orifices 220. As shown, the plurality of detonation orifices 220 have an equidistant offset from the meridian line 217. Also as shown, the plurality of detonation orifices 220 may be oriented coaxially at a common coaxial plane with respect to the meridian line 217. The common coaxial plane shown in FIGS. 3A and 4A is located coaxially inward from the meridian line 217. In other embodiments, the common coaxial plane may be aligned with the meridian line 217 or the common coaxial plane may be located coaxially outward from the meridian line 217.

As shown in FIGS. 3A-3E and FIGS. 4A-4E, the plurality of detonation orifices 220 may be disposed symmetrically adjacent and/or axisymmetrically adjacent to one another. At least some of the detonation orifices 220 corresponding to the first detonation orifice group 222 may be symmetrically adjacent and/or axisymmetrically adjacent to respective ones of the detonation orifices 220 corresponding to the second detonation orifice group 224. Additionally, or in the alternative, at least some of the detonation orifices 220 corresponding to the first detonation orifice group 222 may be symmetrically adjacent and/or axisymmetrically adjacent to one another, and/or at least some of the detonation orifices 220 corresponding to the second detonation orifice group 224 may be symmetrically adjacent and/or axisymmetrically adjacent to one another.

As shown, for example, in FIGS. 3A-3E, a plurality of detonation orifices 220 that have a symmetric and/or an axisymmetric orientation may include a plurality of first detonation orifices 220 of a first detonation orifice group 222 that are symmetrically adjacent and/or an axisymmetrically adjacent to corresponding ones of a plurality of second detonation orifices 220 of a second detonation orifice group 224. The plurality of detonation orifices 220 in the first detonation orifice group 222 may be oriented in an alternating sequence with corresponding ones of the plurality of detonation orifices 220 in the second detonation orifice group 224. The alternating sequence may include at least some of the detonation orifices 220 in the first detonation orifice group 222 being symmetrically adjacent and/or axisymmetrically adjacent to at least some of the detonation orifices 220 in the second detonation orifice group 224. In some embodiments, at least some of the detonation orifices 220 in the first detonation orifice group 222 may be symmetrically adjacent and/or axisymmetrically adjacent to one another, for example, as opposed to having one or more of the detonation orifices 220 in the second detonation orifice group 224 being disposed adjacently therebetween. Additionally, or in the alternative, at least some of the detonation orifices 220 in the second detonation orifice group 224 may be symmetrically adjacent and/or axisymmetrically adjacent to one another, for example, as opposed to having one or more of the detonation orifices 220 in the first detonation orifice group 222 being disposed adjacently therebetween.

As shown, for example, in FIGS. 4A-4E, a plurality of detonation orifices 220 that have a symmetric orientation and/or an axisymmetric orientation may include a plurality of detonation orifices 220 of a first detonation orifice group 222 that are oriented coaxially with respect to corresponding ones of a plurality of detonation orifices 220 of a second detonation orifice group 224. The coaxial orientation of the plurality of detonation orifices 220 may include at least some of the detonation orifices 220 in the first detonation orifice group 222 circumferentially surrounding a respective detonation orifice 220 of the second detonation orifice group 224. Additionally, or in the alternative, the coaxial orientation may include at least some of the detonation orifices 220 in the second detonation orifice group 224 circumferentially surrounding a respective detonation orifice 220 of the first detonation orifice group 222. In addition to the detonation orifices 220 being oriented coaxially with respect to one another, as shown in FIGS. 4A-4E, the first detonation orifice group 222 and the second detonation orifice group 224 may include a plurality of detonation orifices 220 oriented in an alternating sequence, such as an alternating sequence that includes at least some of the detonation orifices 220 in the first detonation orifice group 222 being symmetrically adjacent and/or axisymmetrically adjacent to a detonation orifice 220 in the second detonation orifice group 224. Additionally, or in the alternative, the coaxially oriented plurality of detonation orifices 220 may include at least some of the detonation orifices 220 in the first detonation orifice group 222 being symmetrically adjacent and/or axisymmetrically adjacent to one another, and/or at least some of the detonation orifices 220 in the second detonation orifice group 224 being symmetrically adjacent and/or axisymmetrically adjacent to one another. For example, at least some of the detonation orifices 220 in the first detonation orifice group 222 may circumferentially surround a respective one of the detonation orifices 220 in the second detonation orifice group 224 and may be symmetrically adjacent and/or axisymmetrically adjacent to a respective one of the detonation orifices 220 in the first detonation orifice group 222 and/or to another one of the detonation orifices 220 in the second detonation orifice group 224. As another example, at least some of the detonation orifices 220 in the second detonation orifice group 224 may circumferentially surround a respective one of the detonation orifices 220 in the first detonation orifice group 222 and may be symmetrically adjacent and/or axisymmetrically adjacent to a respective one of the detonation orifices 220 in the second detonation orifice group 224 and/or to another one of the detonation orifices 220 in the first detonation orifice group 222. Additionally, or in the alternative, a plurality of detonation orifices 220 in the first detonation orifice group 222 that are respectively circumferentially surrounded by a detonation orifice 220 of the second detonation orifice group 224 may be symmetrically adjacent and/or axisymmetrically adjacent to another one of the detonation orifices 220 in the first detonation orifice group 222. Additionally, or in the alternative, a plurality of detonation orifices 220 in the second detonation orifice group 224 that are respectively circumferentially surrounded by a detonation orifice 220 of the first detonation orifice group 222 may be symmetrically adjacent and/or axisymmetrically adjacent to another one of the detonation orifices 220 in the second detonation orifice group 224.

As shown, for example, in FIGS. 3A and 4A, the plurality of detonation orifices 220 may perimetrically surround the longitudinal axis 250 at an equivalent radial distance from the longitudinal axis 250. The plurality of detonation orifices 220 may collectively define a geometric perimeter 301. For example, as shown, the plurality of detonation orifices 220 may collectively define a geometric perimeter 301 that has an elliptical shape, such as a circular shape. As shown, the geometric perimeter 301 defined by the plurality of detonation orifices 220 has an area that is slightly less than the area defined by the meridian line 217. In other embodiments, the geometric perimeter 301 defined by the plurality of detonation orifices 220 may be equal to or greater than the area defined by the meridian line 217. As shown, the geometric perimeter 301 defined by the plurality of detonation orifices 220 has geometric congruence with the circular shape of the meridian line 217. Also as shown, with further reference to FIG. 2, the plurality of detonation orifices 220 have geometric congruence with the elliptical or cylindrical shape of the annular midplane 215, as well as geometric congruence with the elliptical or cylindrical shape of the inward and outward detonation chamber walls 204.

Still referring to FIGS. 3A and 4A, adjacent ones of the plurality of detonation orifices 220 may be uniformly spaced about the geometric perimeter 301 defined collectively by the plurality of detonation orifices 220. The uniformly spaced detonation orifices 220 may be spaced from one another by a perimetric interval, such as an intra-group perimetric interval 303 as between adjacent detonation orifices 220 in a respective detonation group, and/or an inter-group perimetric interval 305 as between adjacent detonation orifices 220 from respectively different detonation orifice groups. For example, at least some of the detonation orifices 220 in the first detonation orifice group 222 may be uniformly spaced from one another by a first intra-group perimetric interval 307. Additionally, or in the alternative, at least some of the detonation orifices 220 in the second detonation orifice group 224 may be uniformly spaced from one another by a second intra-group perimetric interval 309. Additionally, or in the alternative, at least some of the detonation orifices 220 in the first detonation orifice group 222 may be uniformly spaced from adjacent ones of the detonation orifices 220 in the second detonation orifice group 224 by an inter-group perimetric interval 305. An intra-group perimetric interval 303 may be the same or different as between respective detonation orifice groups. For example, the first intra-group perimetric interval 307 and the second intra-group perimetric interval 309 may be the same or different from one another. Additionally, or in the alternative, an inter-group perimetric interval 305 may be the same or different as between respective pairs of detonation orifice groups.

In some embodiments, the uniformly spaced detonation orifices 220 may have equidistant spacing. Additionally, or in the alternative, in some embodiments, the uniformly spaced detonation orifices 220 may have proportionate spacing. By way of example, as shown in FIGS. 3A and 4A, the plurality of detonation orifices 220 are uniformly spaced about an elliptical perimeter, such as a circular perimeter, with equidistant circumferential spacing. Additionally, or in the alternative, the plurality of detonation orifices 220 may be uniformly spaced about the elliptical perimeter with proportionate circumferential spacing. In some embodiments, such proportionate spacing may be proportional to a distance of a respective detonation orifice 220 from a reference element of the detonation combustor about which the plurality of detonation orifices are oriented. The reference element may include a longitudinal axis 250 of the detonation chamber 206 and/or of the detonation manifold 208, a detonation chamber wall 204 circumferentially surrounding the longitudinal axis 250 of the detonation chamber 206, a detonation manifold wall circumferentially surrounding the longitudinal axis 250 of the detonation manifold 208, an annular midplane 215, and/or a meridian line 217 located at a longitudinal position along the longitudinal axis 250 that defines a perimeter of at least one of: the detonation chamber wall 204, the detonation manifold wall, and the annular midplane 215.

For example, a plurality of detonation orifices 220 may be uniformly spaced about an elliptical perimeter with proportionate circumferential spacing, such as proportionate to a radial distance between the respective detonation orifice 220 and the longitudinal axis 250, proportionate to a radial distance between the meridian line 217 and the longitudinal axis 250, and/or proportionate to a radial distance between a detonation chamber wall 204 and the longitudinal axis 250. As another example, the plurality of detonation orifices 220 may be uniformly spaced about a linear or curvilinear portion of a geometric perimeter 301 defined collectively by respective ones of the plurality of detonation orifices 220, with respective ones of the plurality of detonation orifices 220 being proportionally spaced from one another in relation to a distance between the respective detonation orifices 220 and at least one of: the longitudinal axis 250, the meridian line 217, and a detonation chamber wall 204. Additionally, or in the alternative, the plurality of detonation orifices 220 may be uniformly spaced about a linear or curvilinear portion of a perimeter defined collectively by respective ones of the plurality of detonation orifices 220, with respective ones of the plurality of detonation orifices 220 being proportionally spaced from one another in relation to a linear distance between the respective detonation orifice 220 and the longitudinal axis 250, a linear distance between the meridian line 217 and the longitudinal axis 250, and/or a linear distance between a detonation chamber wall 204 and the longitudinal axis 250.

Referring still to FIGS. 3A-3E and FIGS. 4A-4E, in some embodiments, respective ones of the plurality of manifold conduits 302 may include a distribution plenum 314 defined by a monolithic structure of the detonation manifold 208 or otherwise disposed within the detonation manifold 208. Detonation fluid 209 may be supplied to the distribution plenum 314 at one or more locations. The respective distribution plenum 314 may have an annular or a semiannular configuration. As shown, the first manifold conduit 304 may include a first distribution plenum 316, and/or the second manifold conduit 306 may include a second distribution plenum 318. The first distribution plenum 316 may be defined by one or more first conduit walls 308. The second distribution plenum 318 may be defined by one or more second conduit walls 310. In some embodiments, respective ones of a plurality of distribution plenum 314 may be concentrically adjacent to one another, as shown, for example, in FIGS. 3A-3E. Additionally, or in the alternative, respective ones of the plurality of distribution plenum 314 may be longitudinally adjacent to one another, as shown, for example in FIGS. 4A-4E.

As further shown in FIGS. 3A-3E and FIGS. 4A-4E, the plurality of manifold conduits 302 may include a plurality of outlet conduits 320 leading to respective ones of the plurality of detonation orifices 220. The plurality of outlet conduits 320 may be defined by a monolithic structure of the detonation manifold 208 or otherwise disposed within the detonation manifold 208. A plurality of outlet conduits 320 may respectively define at least a portion of a corresponding one of the plurality of detonation fluid pathways 201. The plurality of manifold conduits 302 may be in communication with the detonation chamber 206 by way of the plurality of detonation orifices 220 corresponding to the respective ones of the plurality of outlet conduits 320. The first manifold conduit 304 may include a first outlet conduit group 322 that includes a first plurality of outlet conduits 320. The plurality of outlet conduits 320 in the first outlet conduit group 322 may lead to respective ones of the plurality of detonation orifices 220 in the first detonation orifice group 222. The plurality of outlet conduits 320 in the first outlet conduit group 322 may define at least a portion of the first detonation fluid pathway 205. Additionally, or in the alternative, the second manifold conduit 306 may include a second outlet conduit group 324 that includes a second plurality of outlet conduits 320. The plurality of outlet conduits 320 in the second outlet conduit group 324 may lead to respective ones of the plurality of detonation orifices 220 in the second detonation orifice group 224. The plurality of outlet conduits 320 in the second outlet conduit group 324 may define at least a portion of the second detonation fluid pathway 207.

Figure 4C:
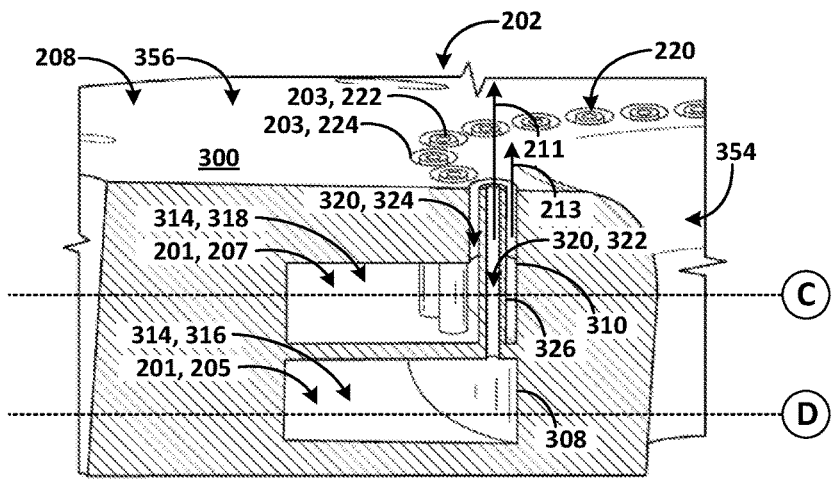
Figure 4D:
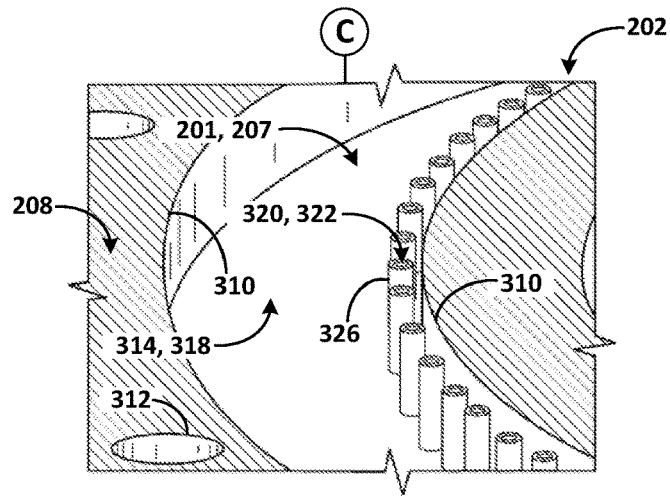
Figure 4E:
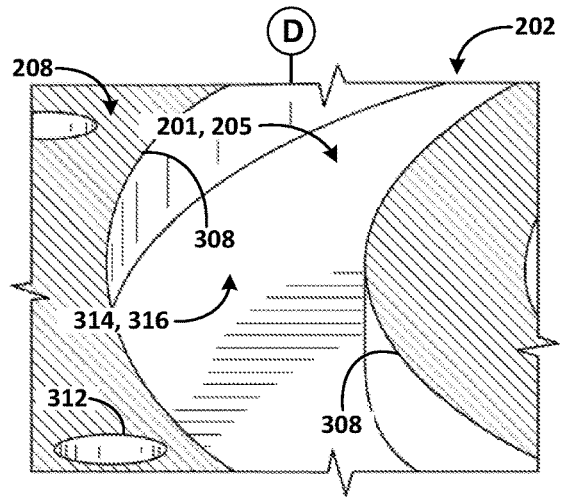

In some embodiments, at least some of the outlet conduits 320 corresponding to a respective manifold conduit 302 may traverse a distribution plenum 314 corresponding to another one of the plurality of manifold conduits 302. A portion of the plurality of outlet conduits 320 that traverse such a distribution plenum 314 may be fluidly isolated from the distribution plenum 314 by a monolithic structure of the detonation manifold 208, such as by a crossover conduit wall 326. By way of example, as shown in FIG. 3B, the plurality of outlet conduits 320 in the second outlet conduit group 324 may traverse the first distribution plenum 316. The monolithic structure of the detonation manifold 208 fluidly isolating the plurality of outlet conduits 320 in the second outlet conduit group 324 from the first distribution plenum 316 may include a plurality of crossover conduit walls 326 corresponding to respective ones of the plurality of outlet conduits 320 in the second outlet conduit group 324. As another example, as shown in FIGS. 4C and 4D, the plurality of outlet conduits 320 in the first outlet conduit group 322 may traverse the second distribution plenum 318. The monolithic structure of the detonation manifold 208 fluidly isolating the plurality of outlet conduits 320 in the first outlet conduit group 322 from the second distribution plenum 318 may include a plurality of crossover conduit walls 326 corresponding to respective ones of the plurality of outlet conduits 320 in the first outlet conduit group 322.

Referring now to FIGS. 5A-5E, and FIGS. 6A-6H exemplary groupings and arrangements of detonation orifices 220 are further described. As shown, a detonation manifold 208 may include a plurality of detonation orifice groups 203, such as a first detonation orifice group 222 and a second detonation orifice group 224. The plurality of detonation orifice groups 203 may respectively include a plurality of detonation orifices 220 in fluid communication with a corresponding one of a plurality of manifold conduits 302. The plurality of detonation orifices 220 may be disposed symmetrically adjacent and/or axisymmetrically adjacent to one another. The plurality of detonation orifices 220 corresponding to a respective detonation orifice group 203 may be disposed symmetrically adjacent and/or axisymmetrically adjacent to a detonation orifice 220 corresponding to another one of the plurality of detonation orifice groups 203. For example, respective detonation orifices 220 corresponding to the first detonation orifice group 222 may be disposed symmetrically adjacent and/or axisymmetrically adjacent to a detonation orifice 220 corresponding to the second detonation orifice group 224. As shown, for example, in FIGS. 6A-6H, a plurality of detonation orifice groups 203 may respectively include a plurality of detonation orifices 220 oriented coaxially with respect to one another. The coaxially oriented detonation orifices 220 may be respectively defined by a structure, such as a monolithic structure, of the detonation manifold 208. As shown, the coaxially oriented detonation orifices 222 may be disposed symmetrically adjacent and/or axisymmetrically adjacent to one another. It will be appreciated that the detonation orifices 220 shown in FIGS. 5A-5E and FIGS. 6A-6H are depicted in a linear arrangement for illustrative convenience, and that the detonation orifices 220 may have any desired configuration in accordance with the present disclosure, such as an elliptical or a circular configuration, for example, with a geometrically congruent perimeter.

Figure 5A:
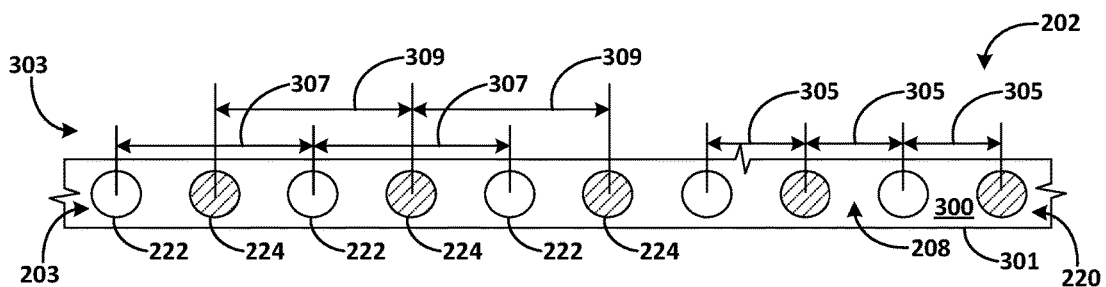
FIGS. 5A-5E schematically depict exemplary arrangements of detonation orifices that may be included in a detonation manifold.
Figure 5B:
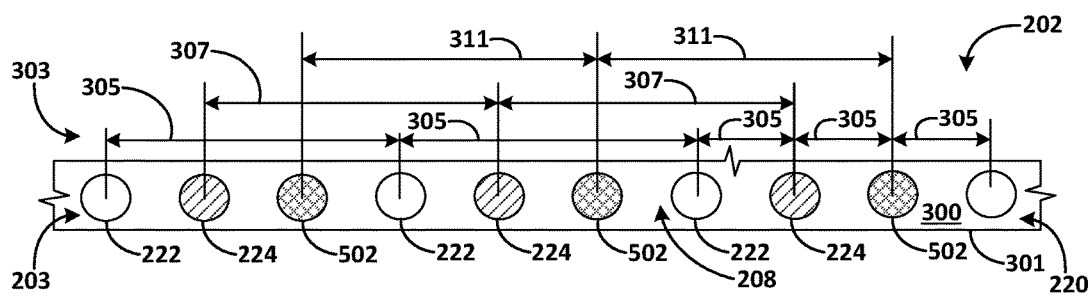
Figure 5C:
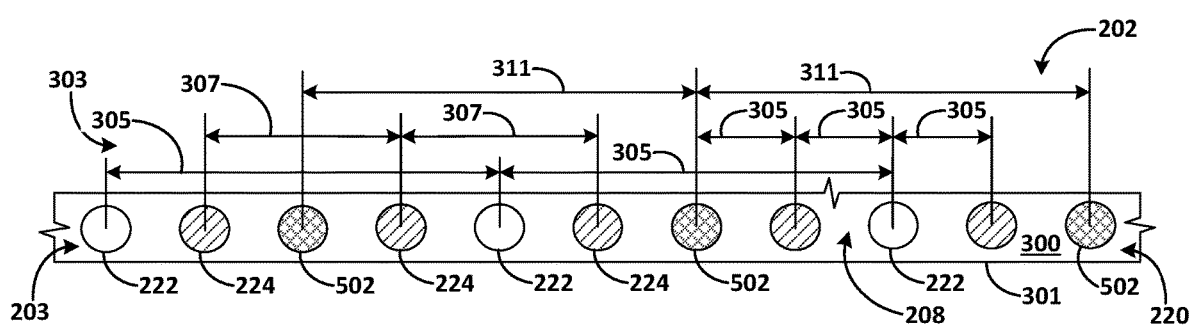

As shown in FIGS. 5A-5E, and FIGS. 6A-6H, the plurality of detonation orifices 220 may be configured and arranged with an alternating sequence. By way of example, FIGS. 5A-5E respectively show a plurality of detonation orifices 220 arranged in a sequence that includes a plurality of first detonation orifices 220 of a first detonation orifice group 222 respectively disposed symmetrically adjacent and/or axisymmetrically adjacent to corresponding ones a plurality of second detonation orifices 220 of a second detonation orifice group 224. FIGS. 5B and 5C respectively show a plurality of detonation orifices 220 arranged in a sequence that includes a third plurality of detonation orifices 220 corresponding to a third detonation orifice group 502 respectively disposed symmetrically adjacent and/or axisymmetrically adjacent to corresponding ones of a plurality of first detonation orifices 220 of the first detonation orifice group 222 and/or to corresponding ones a plurality of second detonation orifices 220 of the second detonation orifice group 224. The third plurality of detonation orifices 220 corresponding to a third detonation orifice group 502 may be configured to supply a third detonation fluid 209 to the detonation chamber 206, for example, by way of a third manifold conduit 302 fluidly isolated from the first manifold conduit 304 and/or the second manifold conduit 306.

Figure 6A:
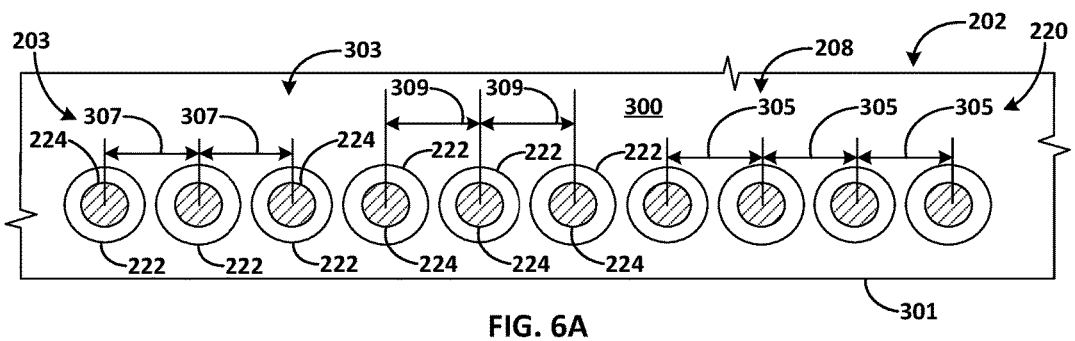
FIGS. 6A-6H schematically depict exemplary groupings and arrangements of detonation orifices that may be included in a detonation manifold.
Figure 6B:
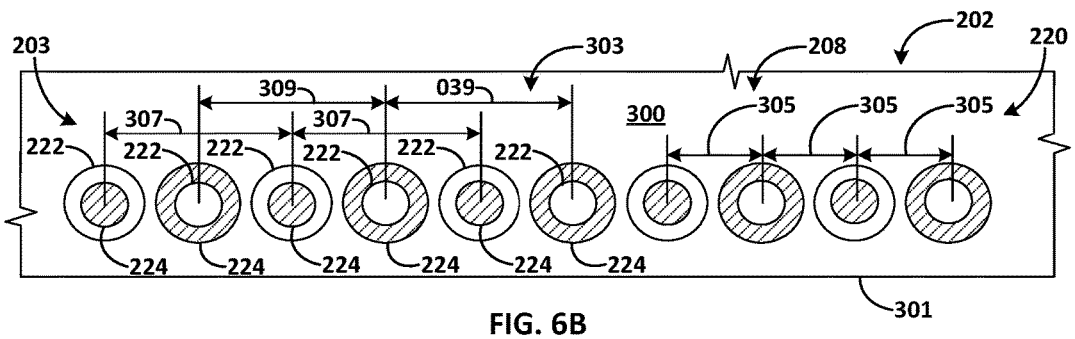
Figure 6C:
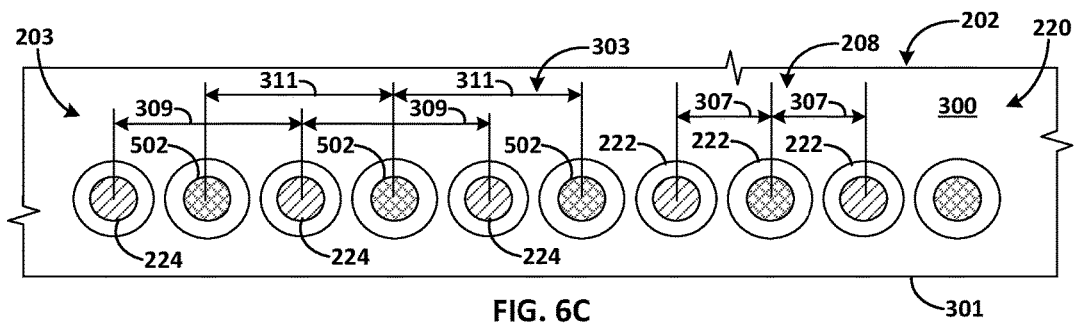
Figure 6D:
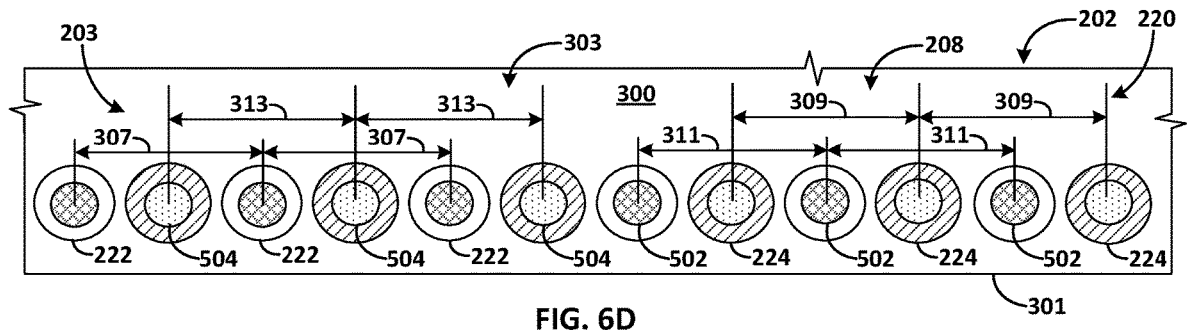

As another example, as shown in FIGS. 6A-6H, a detonation manifold 208 may include a first detonation orifice group 222 and a second detonation orifice group 224 with coaxially oriented detonation orifices 220. The coaxially oriented detonation orifices 220 may be disposed symmetrically adjacent and/or axisymmetrically adjacent to one another. As shown, at least some of the detonation orifices 220 in the first detonation orifice group 222 may circumferentially surround a corresponding one of the detonation orifices 220 in the second detonation orifice group 224. Additionally, or in the alternative, as shown, for example, in FIG. 6B, at least some of the detonation orifices 220 in the first detonation orifice group 222 may circumferentially surround a corresponding one of the detonation orifices 220 in the second detonation orifice group 224, and at least some of the detonation orifices 220 in the second detonation orifice group 224 may circumferentially surround a corresponding one of the detonation orifices 220 in the first detonation orifice group 222. FIGS. 6C and 6D respectively show a plurality of detonation orifices 220 arranged in a sequence that includes a third plurality of detonation orifices 220 corresponding to a third detonation orifice group 502 coaxially oriented with respect to corresponding ones of the plurality of detonation orifices 220 in the first detonation orifice group 222. In other embodiments, at least some of the detonation orifices 220 in the third detonation orifice group 502 may be coaxially oriented with respect to corresponding detonation orifices 220 in the second detonation orifice group 224. FIG. 6D shows a plurality of detonation orifices 220 arranged in a sequence that includes a fourth plurality of detonation orifices 220 corresponding to a fourth detonation orifice group 504 coaxially oriented with respect to corresponding ones of the plurality of detonation orifices 220 in the second detonation orifice group 224. In other embodiments, at least some of the detonation orifices 220 in the fourth detonation orifice group 504 may be coaxially oriented with respect to corresponding detonation orifices 220 in the first detonation orifice group 222 and/or the third detonation orifice group 502.

As shown in FIGS. 5A-5E and FIGS. 6A-6H, at least some of the plurality of detonation orifices 220 may be uniformly spaced about a geometric perimeter 301 defined collectively by the plurality of detonation orifices 220. As shown, a plurality of detonation orifices 220 in the first detonation orifice group 222 may be uniformly spaced from one another by a first intra-group perimetric interval 307. A plurality of the detonation orifices 220 in the second detonation orifice group 224 may be uniformly spaced from one another by a second intra-group perimetric interval 309. As shown, for example, in FIGS. 5B and 5C, 6C, 6D, 6F, and 6G, a plurality of detonation orifices 220 in a fourth detonation orifice group 504 may be uniformly spaced from one another by a third intra-group perimetric interval 311. As shown, for example, in FIGS. 6D and 6H, a plurality of detonation orifices 220 in a fourth detonation orifice group 504 may be uniformly spaced from one another by a fourth intra-group perimetric interval 313. In some embodiments, as shown, for example, in FIGS. 5A-5D, and FIGS. 6A, 6B, and 6D, the first intra-group perimetric interval 307 may be equivalent to the second intra-group perimetric interval 309. Additionally, or in the alternative, as shown, for example, in FIGS. 5E and 6C, the first intra-group perimetric interval 307 may differ from the second intra-group perimetric interval 309. The third intra-group perimetric interval 311 may be equivalent or may differ from the first intra-group perimetric interval 307 and/or the second intra-group perimetric interval 309, as shown, for example, in FIGS. 5B and 5C, FIGS. 6C and 6D, and FIGS. 6G and 6H.

As shown in FIGS. 5A-5E and FIGS. 6A-6H, in some embodiments, the detonation orifices 220 in a plurality of detonation orifice groups 203 may be uniformly spaced from one another by an inter-group perimetric interval 305. For example, as shown in FIGS. 5A-5C, and FIGS. 6A-6H, the detonation orifices 220 in the first detonation orifice group 222 may be uniformly spaced from adjacent ones of the detonation orifices 220 in the second detonation orifice group 224 by an inter-group perimetric interval 305. Additionally, or in the alternative, as shown in FIGS. 5A-5C, the detonation orifices 220 in the first detonation orifice group 222 and/or the detonation orifices 220 in the second detonation orifice group 224 may be uniformly spaced from adjacent ones of the detonation orifices 220 in the third detonation orifice group 502 and/or the fourth detonation orifice group 504 by an inter-group perimetric interval 305.

Figure 5D:
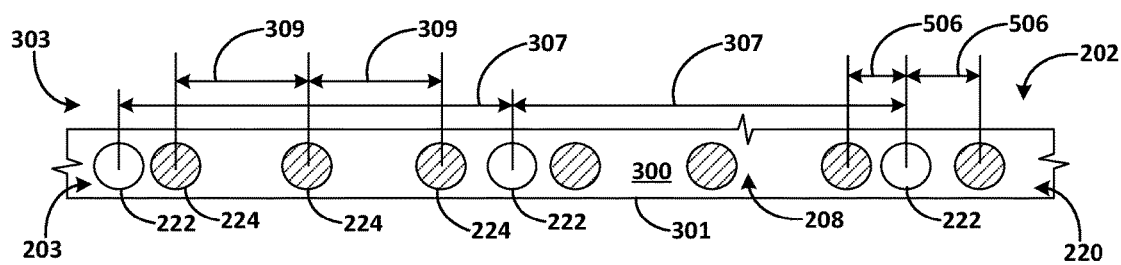
Figure 5E:
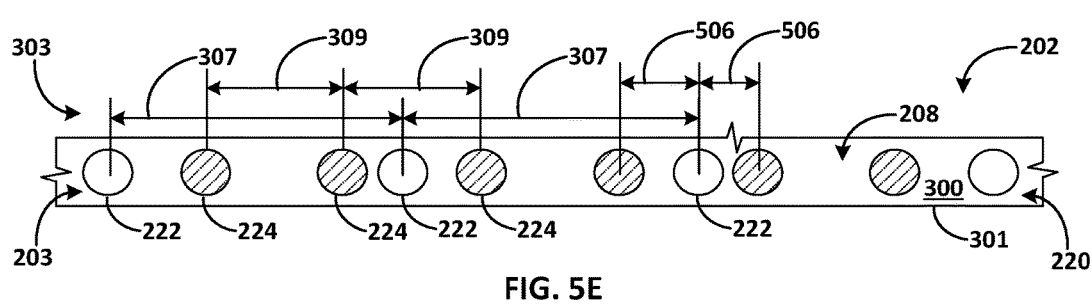

Additionally, or in the alternative, as shown, for example, in FIGS. 5D and 5E, a plurality of detonation orifices 220 in a respective detonation orifice group 203 may have an incongruent inter-group perimetric interval 506. As used herein, the term "incongruent inter-group perimetric interval" refers to an inter-group perimetric interval that differs as between adjacent ones of a plurality of detonation orifices 220 in respective ones of a plurality of detonation orifice groups 203. For example, as shown in FIGS. 5D and 5E, the detonation orifices 220 in the first detonation orifice group 222 may have an incongruent inter-group perimetric interval 506 as between adjacent ones of the detonation orifices 220 in the second detonation orifice group 224.

As shown, for example, in FIGS. 6E-6H, the detonation orifices 220 in respective ones of a plurality of detonation orifice groups 203 that are uniformly spaced with a respectively different intra-group perimetric interval 303 may include a combination of a plurality of coaxially oriented detonation orifices 220 and a plurality of detonation orifices that lack a coaxially oriented counterpart detonation orifice 220. For example, as shown in FIGS. 6E-6H, a plurality of detonation orifices 220 in a first detonation orifice group 222 may be uniformly spaced from one another by a first intra-group perimetric interval 307, and a plurality of the detonation orifices 220 in a second detonation orifice group 224 may be uniformly spaced from one another by a second intra-group perimetric interval 309. The first intra-group perimetric interval 307 may have a common multiple with the second intra-group perimetric interval 309. Detonation orifices 220 in respective detonation orifice groups 203 may be coaxially oriented for common multiples of the respective intra-group perimetric intervals 303. Detonation orifices 220 in respective detonation orifice groups 203 may lack a coaxially oriented counterpart detonation orifice 220 from another detonation orifice group 203 for multiples of the respective intra-group perimetric intervals 303 that do not coincide with one another. Such multiples of the respective intra-group perimetric intervals 303 that do not coincide with one another are sometimes referred to as a non-coinciding multiple. Additionally, or in the alternative, respective detonation orifice groups 203 that lack a common multiple may be non-coinciding with one another, such that the detonation orifices in the respective detonation orifice groups 203 may lack coaxially oriented counterpart detonation orifices 220 from another detonation orifice group 203.

Figure 6E:
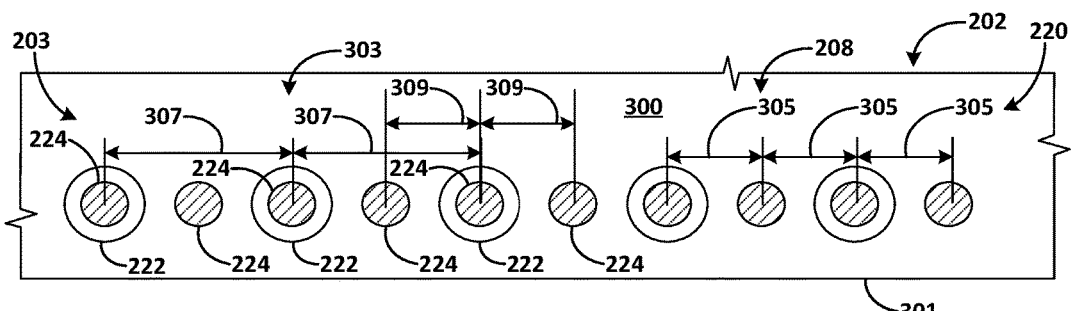
Figure 6F:
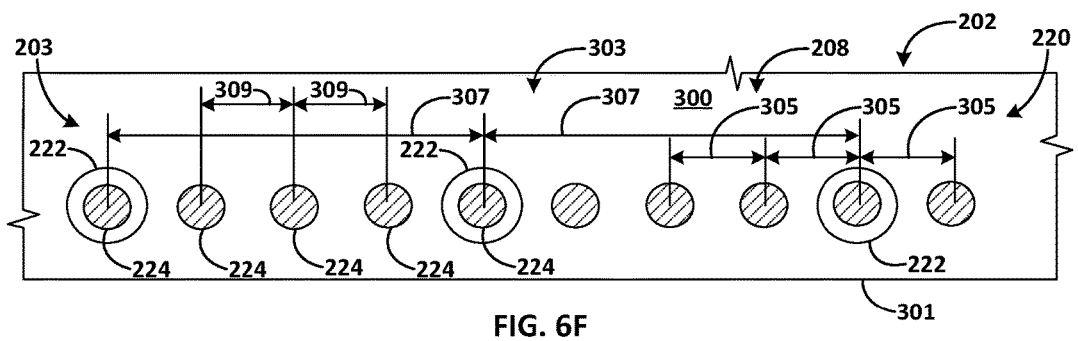

By way of example, as shown in FIGS. 6E-6H, the detonation orifices 220 in the second detonation orifice group 224 may be coaxially oriented with detonation orifices 220 in the first detonation orifice group 222 for common multiples of the first intra-group perimetric interval 307 and the second intra-group perimetric interval 309. The detonation orifices 220 in the second detonation orifice group 224 may lack a coaxially oriented counterpart detonation orifice 220 from the first detonation orifice group 222 for non-coinciding multiples of the first intra-group perimetric interval 307 and the second intra-group perimetric interval 309. For example, as shown in FIG. 6E, the first intra-group perimetric interval 307 may have a multiple of two (2) and the second intra-group perimetric interval 309 may have a multiple of one (1). The detonation orifices 220 in the second detonation orifice group 224 may be coaxially oriented with detonation orifices 220 in the first detonation orifice group 222 for common multiples of two (2), such as detonation orifices 220 located at positions 1, 3, 5, 7, and so forth, or detonation orifices 220 located at positions 2, 4, 6, 8, and so forth. As another example, as shown in FIG. 6F, the first intra-group perimetric interval 307 may have a multiple of four (4) and the second intra-group perimetric interval 309 may have a multiple of one (1). The detonation orifices 220 in the second detonation orifice group 224 may be coaxially oriented with detonation orifices 220 in the first detonation orifice group 222 for common multiples of four (4), such as detonation orifices 220 located at positions 1, 4, 8, 12, and so forth, or detonation orifices 220 located at positions 2, 5, 7, 7, and so forth, etc.

Figure 6G:
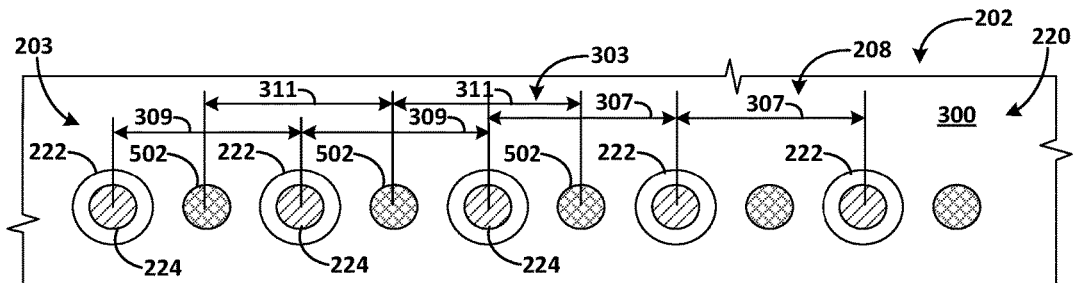

In some embodiments, as shown in FIG. 6G, detonation orifices in a respective detonation orifice group 203 may lack a coaxially oriented counterpart detonation orifice 220 from another detonation orifice group 203 for offset multiples of the respective intra-group perimetric intervals 303 that do not coincide with one another. Such offset multiples may include an even multiple and an odd multiple that do not coincide with one another. Such offset multiples may include an offset of one or more detonation orifice-units. For example, as shown in FIG. 6G, the first intra-group perimetric interval 307 and the second intra-group perimetric interval 309 may respectively have an odd multiple of two (2), and the third intra-group perimetric interval 311 may have an even multiple of two (2). The second intra-group perimetric interval 309 may be offset by zero (0) detonation orifice-units. The third intra-group perimetric interval 311 may be offset by one (1) detonation orifice-unit. The second intra-group perimetric interval 309 may have a common multiple of two (2) with the first intra-group perimetric interval 307. The detonation orifices 220 in the second detonation orifice group 224 may be coaxially oriented with detonation orifices 220 in the first detonation orifice group 222 for common multiples of two (2), such as odd multiples of two (2), such as multiples of two (2), offset by zero (0) detonation orifice-unit, located at positions 1, 3, 5, 7, and so forth. The detonation orifices 220 in the third detonation orifice group 502 lack coaxially oriented counterpart detonation orifices 220, as the third intra-group perimetric interval 311, being offset by one (1) detonation orifice-unit, lacks a common multiple with the first intra-group perimetric interval 307 as well as the second intra-group perimetric interval 309. The detonation orifices 220 in the third detonation orifice group 502 are located at even multiples of two (2), such as multiples of two (2), offset by one (1) detonation orifice-unit, located at positions 2, 4, 6, 8, and so forth. Such even multiples of two (2) are non-coinciding with odd multiples of two (2) corresponding to the first detonation orifice group 222 and the second detonation orifice group 224.

Figure 6H:
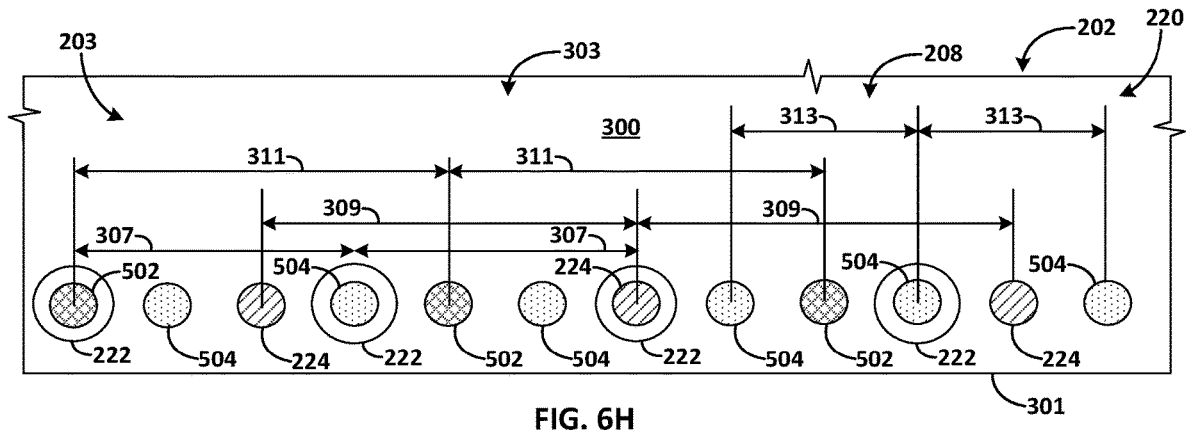

As another example, as shown in FIG. 6H, a first detonation orifice group 222 may have a first intra-group perimetric interval 307 that has a multiple of three (3), with an offset of zero (0) detonation orifice-units; a second detonation orifice group 224 may have a second intra-group perimetric interval 309 that has a multiple of four (4), with an offset of two (2) detonation orifice-units; a third detonation orifice group 502 may have a third intra-group perimetric interval 311 that has an multiple of four (4) detonation orifice-units, with an offset of zero (0) detonation orifice-units; and a fourth detonation orifice group 504 may have a fourth intra-group perimetric interval 313 that has a multiple of two (2), with an offset of one (1) detonation orifice-units. As shown in FIG. 6H, by way of example, the second intra-group perimetric interval 309 and the first intra-group perimetric interval 307 have a common multiple of twelve (12). The detonation orifices 220 in the second detonation orifice group 224 may be coaxially oriented with detonation orifices 220 in the first detonation orifice group 222 for common multiples of twelve (12), offset by six (6) detonation orifice-units. The third intra-group perimetric interval 311 and the first intra-group perimetric interval 307 have a common multiple of twelve (12). The detonation orifices 220 in the third detonation orifice group 502 may be coaxially oriented with detonation orifices 220 in the first detonation orifice group 222 for coinciding multiples of twelve (12), offset by zero (0) detonation orifice-units. The fourth intra-group perimetric interval 313 and the first intra-group perimetric interval 307 have a common multiple of six (6). The detonation orifices 220 in the fourth detonation orifice group 504 may be coaxially oriented with detonation orifices 220 in the first detonation orifice group 222 for coinciding multiples of six (6), offset by three (3) detonation orifice-units.

As further shown in FIG. 6H, by way of further example, the second intra-group perimetric interval 309, the third intra-group perimetric interval 311, and the fourth intra-group perimetric interval 313 respectively lack a common multiple with one another, for example, as a result of the respective offsets. As such, the detonation orifices 220 in the second detonation orifice group 224, the third detonation orifice group 502, and the fourth detonation orifice group 504 are respectively non-coinciding with one another. For example, the second intra-group perimetric interval 309 may have an odd multiple of four (4), offset by two (2) detonation orifice-units, the third intra-group perimetric interval 311 may have an odd multiple of four (4), offset by zero (0) detonation orifice-units, and the fourth intra-group perimetric interval 313 may have an even multiple of two (2), offset by one (1) detonation orifice-unit. As such, the detonation orifices 220 in the fourth detonation orifice group 504 are non-coinciding with the detonation orifices 220 in the second detonation orifice group 224 and the third detonation orifice group 502, and the detonation orifices 220 in the second detonation orifice group 224 are non-coinciding with the detonation orifices 220 in the third detonation orifice group 502.

An exemplary detonation manifold 208 may include any desired number of manifold conduits 302 respectively fluidly communicating with a plurality of detonation orifices 220 corresponding to a detonation orifice group 203 associated with the respective manifold conduits 302. By way of example, a detonation manifold 208 may include from 2 to 6 manifold conduits 302, such as from 2 to 4 manifold conduits 302, such as 2 or 3 manifold conduits 302. An exemplary detonation manifold 208 may include from 2 to 6 detonation orifice groups 203 respectively corresponding to a respective one of a plurality of manifold conduits 302, such as from 2 to 4 detonation orifice groups 203, such as 2 or 3 detonation orifice groups 203.

A detonation combustion system 200 may be configured to provide one or more detonation fluids 209 to a detonation chamber 206 using one or more of the respective detonation fluid pathways 201 with any desired fluid dynamics, such as volumetric flow rate, flow velocity, pressure, and/or pressure drop across, across the detonation orifices 220 in the respective detonation orifice group 203. In some embodiments, a plurality of detonation fluid pathways 201 may be respectively configured to provide a detonation fluid 209 at a respectively different flow rate, and with the same or similar pressure and/or pressure drop across the corresponding plurality of detonation orifices 220. By providing a plurality of detonation fluid pathways 201 that have a similar pressure and/or pressure drop at respectively different flow rates, the detonation chamber 206 may receive detonation fluid 209 with comparable fluid dynamics at the respectively different flow rates. For example, the detonation fluid 209 may comparably interact with the shock waves 248 and corresponding detonation waves 246 during detonation at respectively different flow rates of detonation fluid 209. The respectively different flow rates may allow for a correspondingly different level of thrust, for example, that may be suitable for respectively different operating conditions. Additionally, or in the alternative, in some embodiments, a plurality of detonation fluid pathways 201 may be respectively configured to provide a detonation fluid 209 at a respectively different pressure and/or pressure drop across the corresponding plurality of detonation orifices 220, and with the same or similar flow rate. By providing a plurality of detonation fluid pathways 201 that have a similar flow rate at respectively different pressure and/or pressure drop, the detonation chamber 206 may receive detonation fluid 209 at a selected flow rate with respectively fluid dynamics, which may provide for respectively different combustion dynamics, such as detonation dynamics, that may be desirable for respectively different operating conditions.

In some embodiments, the number of detonation orifices 220 in respective ones of a plurality of detonation orifice groups 203 may be proportional to mass flow of detonation fluid 209 through the detonation orifices 220 in the respective detonation orifice group 203. A number of detonation orifices 220 in a detonation orifice group 203 corresponding to a respective manifold conduit 302 may be selected at least in part to provide desired fluid dynamics of the detonation fluid 209 flowing through the respective detonation orifices 220 from the respective manifold conduit 302 to the detonation chamber 206. Additionally, or in the alternative, a surface area of the detonation orifices 220 in a detonation orifice group 203 corresponding to a respective manifold conduit 302 may be selected at least in part to provide desired fluid dynamics of the detonation fluid 209 flowing through the respective detonation orifices 220 from the respective manifold conduit 302 to the detonation chamber 206.

In some embodiments, a first detonation orifice group 222 corresponding to a first manifold conduit 304 may include a first detonation orifice group 222 configured to provide a flow rate to the detonation chamber 206 that is from about 1% to about 100% of the flow rate of a second detonation orifice group 224 corresponding to a second manifold conduit 306. For example, the flow rate of the first detonation orifice group 222 may be from about 10% to about 90% of the flow rate of the second detonation orifice group 224, such as from about 20% to about 30%, such as from about 30% to about 40%, such as from about 40% to about 60%, such as from about 60% to about 70%, such as from about 70% to about 80%, or such as from about 80% to about 90%, of the flow rate of the second detonation orifice group 224.

In some embodiments, a first detonation orifice group 222 corresponding to a first manifold conduit 304 may include a first detonation orifice group 222 configured to provide a pressure and/or a pressure drop that is from about 1% to about 100% of the pressure and/or the pressure drop across a second detonation orifice group 224 corresponding to a second manifold conduit 306. For example, the pressure and/or pressure drop across the first detonation orifice group 222 may be from about 10% to about 90% of the pressure and/or pressure drop across the second detonation orifice group 224, such as from about 20% to about 30%, such as from about 30% to about 40%, such as from about 40% to about 60%, such as from about 60% to about 70%, such as from about 70% to about 80%, or such as from about 80% to about 90%, of the pressure and/or pressure drop across the second detonation orifice group 224.

In some embodiments, the flow rate from the respective manifold conduits 302 to the detonation chamber 206 for respective detonation orifice groups 203 may be determined under a choked flow condition. As used herein, the term "choked flow" refers to a limiting condition where the mass flow through the plurality of detonation orifices 220 of a detonation orifice group 203 will not increase with a further decrease in the downstream pressure for a given upstream pressure and temperature. In some embodiments, respective ones of a plurality of detonation orifice groups 203 may be configured to provide a substantially uniform pressure drop as between respective detonation orifice groups 203, such as under a respective choked flow condition, and/or such as with an upstream pressure and temperature that are within a suitable range of one another for desired operating conditions. By providing a substantially uniform pressure drop as between respective detonation orifice groups 203, operating variables associated with the pressure of the detonation fluid 209 may be normalized for a plurality of different operating conditions. Additionally, or in the alternative, such operating variables may be tailored to accommodate respectively different operating conditions. By way of example, combustion dynamics may be influenced by a pressure drop of the detonation fluid 209 entering the detonation chamber 206.

In some embodiments, a ratio of a number of detonation orifices 220 in a first detonation orifice group 222 to a number of detonation orifices 220 in a second detonation orifice group 224 may be from 1:20 to 1:1, such as from 1:20 to 1:10, such as from 1:10 to 1:5, such as from 1:5 to 1:1, such as from 1:4 to 1:1, such as from 1:3 to 1:1, such as from 2:3 to 1:1, or such as from 3:4 to 1:1. Additionally, or in the alternative, in some embodiments, a ratio of a number of detonation orifices 220 in a first detonation orifice group 222 to an aggregate number of detonation orifices 220 in a plurality of additional detonation orifice groups 203, such as an aggregate number of detonation orifices in a second detonation orifice group 224 and a third detonation orifice group 502, may be from 1:20 to 1:1, such as from 1:20 to 1:10, such as from 1:10 to 1:5, such as from 1:5 to 1:1, such as from 1:4 to 1:1, such as from 1:3 to 1:1, such as from 2:3 to 1:1, or such as from 3:4 to 1:1. Additionally, or in the alternative, in some embodiments, a ratio of an aggregate surface area of the detonation orifices 220 in a first detonation orifice group 222 to an aggregate surface area of the detonation orifices 220 in a second detonation orifice group 224 may be from 1:20 to 1:1, such as from 1:20 to 1:10, such as from 1:10 to 1:5, such as from 1:5 to 1:1, such as from 1:4 to 1:1, such as from 1:3 to 1:1, such as from 2:3 to 1:1, or such as from 3:4 to 1:1.

A detonation combustion system 200 may be configured to utilize respective ones of a plurality of manifold conduits 302 individually or collectively at a given time. By way of example, in some embodiments, a detonation manifold 208 may be configured to provide a proportionate flow of 100% when utilizing both a first manifold conduit 304 corresponding to a first detonation orifice group 222 and a second manifold conduit 306 corresponding to a second detonation orifice group 224. In one embodiment, the detonation manifold 208 may be configured to provide a proportionate flow of 25% when utilizing the first manifold conduit 304 corresponding to the first detonation orifice group 222. Additionally, or in the alternative, the detonation manifold 208 may be configured to provide a proportionate flow of 75% when utilizing the second manifold conduit 306 corresponding to the second detonation orifice group 224. In another embodiment, the detonation manifold 208 may be configured to provide a proportionate flow of 33% when utilizing the first manifold conduit 304 corresponding to the first detonation orifice group 222, and a proportionate flow of 66% when utilizing the second manifold conduit 306 corresponding to the second detonation orifice group 224. In yet another embodiment, the detonation manifold 208 may be configured to provide a proportionate flow of 50% when utilizing the first manifold conduit 304 corresponding to the first detonation orifice group 222, and a proportionate flow of 50% when utilizing the second manifold conduit 306 corresponding to the second detonation orifice group 224. In yet another embodiment, the detonation manifold 208 may be configured to provide a proportionate flow of 33% when utilizing the first manifold conduit 304 corresponding to the first detonation orifice group 222, a proportionate flow of 33% when utilizing the second manifold conduit 306 corresponding to the second detonation orifice group 224, and a proportionate flow of 33% when utilizing a third manifold conduit 302 corresponding to a third detonation orifice group 502.

Exemplary fuels 62 that may be included in a detonation fluid 209 include liquid fuels and/or gaseous fuels. In some embodiments, at least some of the plurality of detonation fluid pathways 201 may be respectively configured to supply a respectively different fuel to the detonation chamber 206. Additionally, or in the alternative, at least some of the plurality of detonation fluid pathways 201 may be respectively configured to supply a fluid other than fuel to the detonation chamber 206, such as oxidizer 60 that may be mixed with fuel 62, and/or purge air for purging the detonation fluid pathways 201 and/or the detonation chamber 206.

Figure 7:
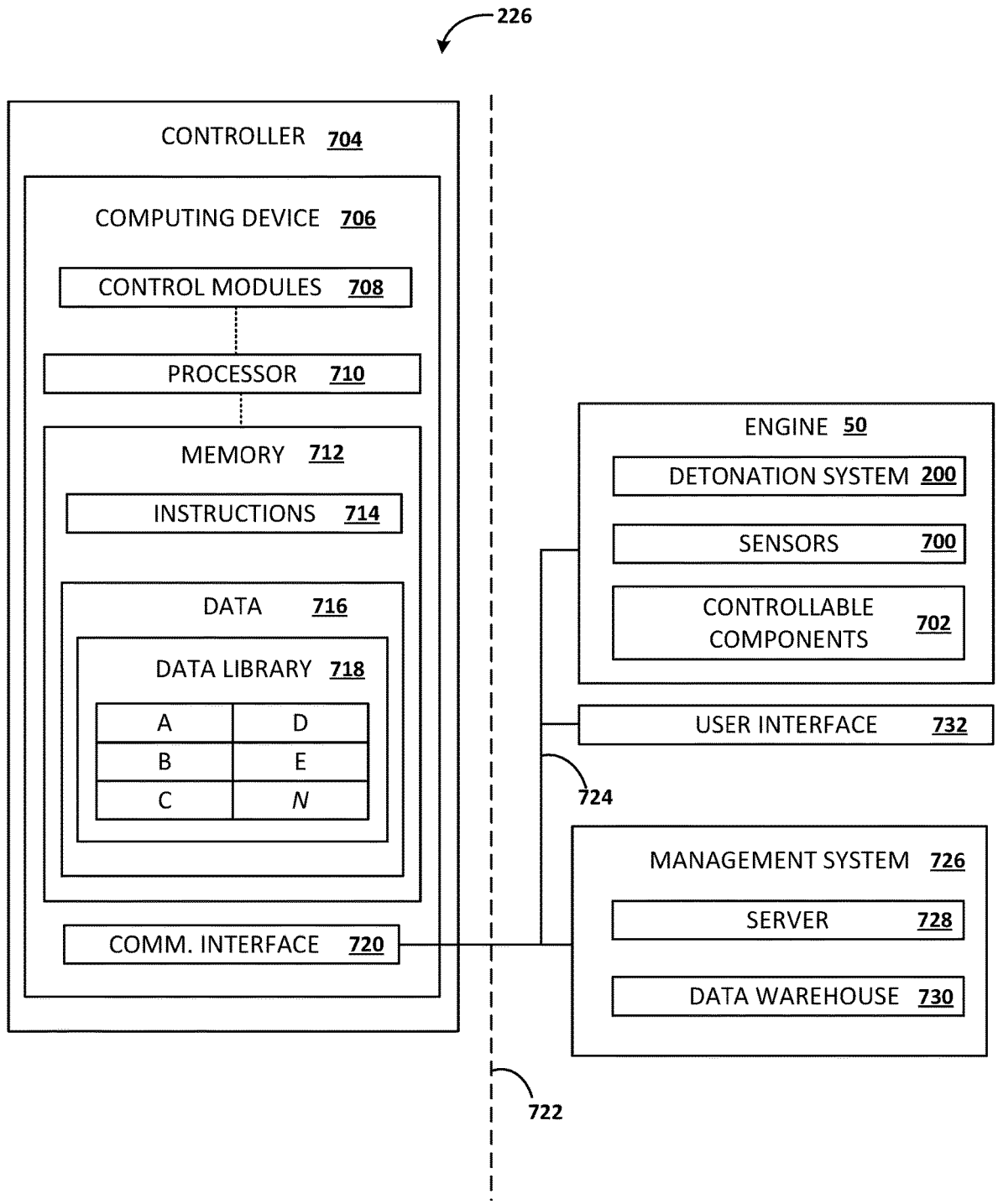
FIG. 7 schematically depicts an exemplary control system that may be utilized to control a detonation combustion system.

Referring now to FIG. 7, an exemplary control system 226 that may be utilized to control a detonation combustion system 200 is described. Operations of the detonation combustion system 200 may be controlled by the control system 226, for example, based at least in part on inputs from one or more sensors 700 associated with the engine 50 and/or the detonation combustion system 200, such as one or more temperature sensors, pressure sensors, engine speed sensors, and so forth. The control system 226 may be configured to receive electronic inputs from the one or more sensors 700, and to provide control commands to one or more controllable components 702, such as the one or more detonation manifold supply valves 228, the one or more fuel supply valves 234, and/or the one or more oxidizer supply valves 240 (FIG. 2), based at least in part on an electronic input from the one or more sensors. Additionally, or in the alternative, the control system 226 may actuate the one or more controllable components 702, such as the one or more detonation manifold supply valves 228, the one or more fuel supply valves 234, and/or the one or more oxidizer supply valves 240 (FIG. 2), based at least in part on an electronic input from a user.

As shown in FIG. 7, an exemplary control system 226 may include a controller 704, such as an electronic engine controller, a full-authority digital engine control (FADEC) device, or the like. The controller 704 may include one or more computing devices 706 configured to perform one or more control operations associated with the detonation combustion system 200 and/or the engine 50. The one or more computing devices 706 may be located locally or remotely relative to the engine 50 and/or the detonation combustion system 200. The control operations may include, determining and/or outputting control commands associated with one or more controllable components 702 of the detonation combustion system 200, such as control commands configured to actuate one or more detonation manifold supply valves 228, one or more fuel supply valves 234, and/or one or more oxidizer supply valves 240. The computing device 706 may be communicatively coupled with the one or more sensors 700 and/or with the one or more controllable components 702. The computing device 706 may include one or more control modules 708 configured to cause the controller 704 to perform the one or more control operations, for example, based at least in part on an input from one or more sensors 700. In some embodiments, a control module 708 may be configured to determine a threshold or setpoint for starting, stopping, increasing, and/or decreasing a flow of fuel 62 and/or oxidizer 60 to the detonation manifold 208. Additionally, or in the alternative, the control module 708 may be configured to determine and/or output control commands to the one or more controllable components 702 based at least in part on such a threshold or setpoint, such as based at least in part on a deviation from such a threshold and/or setpoint.

The one or more computing devices 706 may include one or more processors 710 and one or more memory devices 712. The one or more processors 710 may include any suitable processing device, such as a microprocessor, microcontroller, integrated circuit, logic device, and/or other suitable processing device. The one or more memory devices 712 may include one or more computer-readable media, including but not limited to non-transitory computer-readable media, RAM, ROM, hard drives, flash drives, and/or other memory devices 712. The one or more control modules 708 may be implemented at least in part by the one or more processors 710 and/or the one or more memory devices 712.

As used herein, the terms "processor" and "computer" and related terms, such as "processing device" and "computing device", are not limited to just those integrated circuits referred to in the art as a computer, but broadly refer to a microcontroller, a microcomputer, a programmable logic controller (PLC), an application specific integrated circuit, and other programmable circuits, and these terms are used interchangeably herein. A memory device 712 may include, but is not limited to, a non-transitory computer-readable medium, such as a random-access memory (RAM), and computer-readable nonvolatile media, such as hard drives, flash memory, and other memory devices. Alternatively, a floppy disk, a compact disc-read only memory (CD-ROM), a magneto-optical disk (MOD), and/or a digital versatile disc (DVD) may also be used.

As used herein, the term "non-transitory computer-readable medium" is intended to be representative of any tangible computer-based device implemented in any method or technology for short-term and long-term storage of information, such as, computer-readable instructions, data structures, program modules and sub-modules, or other data in any device. The methods described herein may be encoded as executable instructions embodied in a tangible, non-transitory, computer readable media, including, without limitation, a storage device and/or a memory device. Such instructions, when executed by a processor, cause the processor to perform at least a portion of the methods described herein. Moreover, as used herein, the term "non-transitory computer-readable medium" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

The one or more memory devices 712 may store information accessible by the one or more processors 710, including computer-executable instructions 714 that can be executed by the one or more processors 710. The instructions 714 may include any set of instructions that, when executed by the one or more processors 710, cause the one or more processors 710 to perform operations, including control operations associated with the engine 50 and/or the detonation combustion system 200. The one or more memory devices 712 may store data 716 accessible by the one or more processors 710, such as data associated with the engine 50, the detonation combustion system 200, the sensor 700, and/or the controllable components 702. The data 716 may include current or real-time data 716, past data 716, or a combination thereof. The data 716 may be stored in a data library 718. The data 716 may also include other data sets, parameters, outputs, information, associated with the engine 50 and/or the detonation combustion system 200.

The one or more computing devices 706 may also include a communication interface 720 configured to communicate with various nodes on a communication network 722 via wired or wireless communication lines 724. The communication interface 720 may include any suitable components for interfacing with one or more network(s), including for example, transmitters, receivers, ports, controllers, antennas, and/or other suitable components. The communication network 722 may include, for example, a local area network (LAN), a wide area network (WAN), SATCOM network, VHF network, an HF network, a Wi-Fi network, a WiMAX network, a gatelink network, and/or any other suitable communication network 722 for transmitting messages to and/or from the computing device 706 across the communication lines 724. The communication lines 724 of communication network 722 may include a data bus or a combination of wired and/or wireless communication links.

The control system 226 may include a management system 726 located locally or remotely relative to the engine 50 and/or the detonation combustion system 200. The management system 726 may include a server 728 and/or a data warehouse 730. As an example, at least a portion of the data 716 may be stored in the data warehouse 730, and the server 728 may be configured to transmit data 716 from the data warehouse 730 to the one or more computing device 706, and/or to receive data 716 from the one or more computing devices 706 and to store the received data 716 in the data warehouse 730 for further purposes. The server 728 and/or the data warehouse 730 may be implemented as part of the one or more computing devices 706 and/or as part of the management system 726. The control system 226 may also include a user interface 732 configured to allow a user to interact with the various features of the control system 226, for example, by way of the communication interface 720. The communication interface 720 may allow the one or more computing devices 706 to communicate with various nodes associated with the engine 50 and/or the detonation combustion system 200, the management system 726, and/or the user interface 732.

Figure 8:
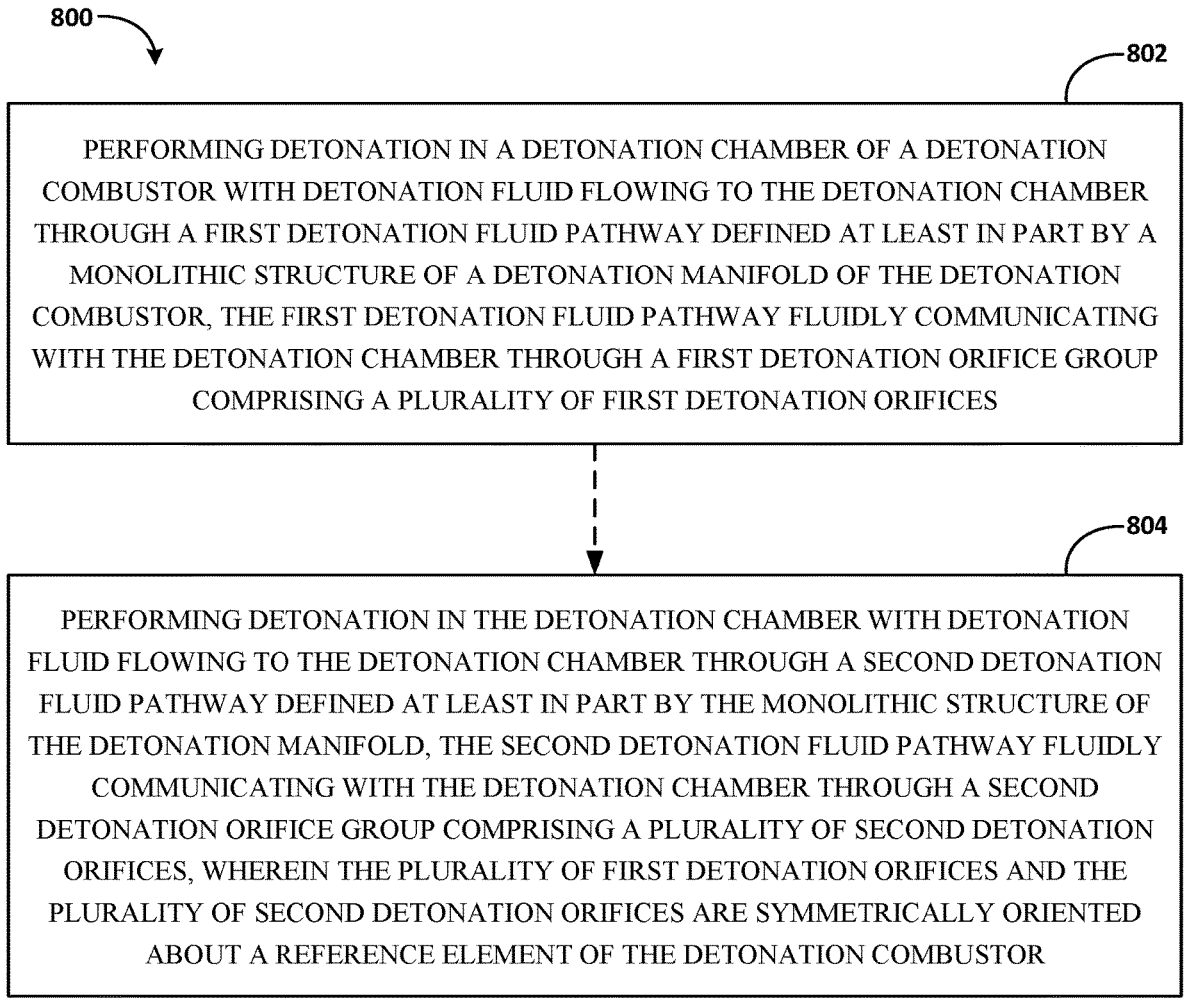
FIG. 8 shows a flow chart depicting an exemplary method of generating thrust.

Referring now to FIG. 8, exemplary methods in accordance with the present disclosure are further described. By way of example, an exemplary method may include a method of generating thrust. Additionally, or in the alternative, an exemplary method may include a method of combusting fuel. Additionally, or in the alternative, an exemplary method may include a method of operating an engine 50, such as a turbine engine 100, a rocket engine, a ramjet, or a combination thereof, such as a turbo-rocket engine, a turbo-ramjet, or a rocket-ramjet.

As shown in FIG. 8, an exemplary method 800 may include, at block 802, performing detonation in a detonation chamber 206 of a detonation combustor 202 with detonation fluid 209 flowing to the detonation chamber 206 through a first detonation fluid pathway 205. The first detonation fluid pathway 205 may be defined at least in part by a monolithic structure of a detonation manifold 208. The first detonation fluid pathway 205 may fluidly communicate with the detonation chamber 206 through a first detonation orifice group 222 that includes a plurality of first detonation orifices 220. The detonation performed while flowing detonation fluid 209 through the first detonation fluid pathway may be performed during a first operating state. The detonation performed while flowing detonation fluid through the first detonation fluid pathway may generate a first level of thrust.

At block 804, the exemplary method 800 may include performing detonation in the detonation chamber 206 with detonation fluid 209 flowing to the detonation chamber 206 through a second detonation fluid pathway 207. The second detonation fluid pathway 207 may be defined at least in part by the monolithic structure of the detonation manifold 208. The second detonation fluid pathway 207 may fluidly communicate with the detonation chamber 206 through a second detonation orifice group 224 that includes a plurality of second detonation orifices 220. The plurality of first detonation orifices 220 and the plurality of second detonation orifices 220 may be symmetrically oriented about a reference element of the detonation combustor 202. The detonation performed while flowing detonation fluid 209 through the second detonation fluid pathway 207 may be performed during a second operating state that differs from the first operating state. The detonation performed while flowing detonation fluid 209 through the second detonation fluid pathway 207 may generate a second level of thrust that differs from the first level of thrust.

Accordingly, the currently disclosed systems and methods may utilize a detonation combustion system to provide varying levels of thrust suitable for respectively different operating conditions. The respective detonation fluid pathways and corresponding detonation groups may be configured and arranged to provide for comparable and/or suitable fluid dynamics with respect to detonation fluid introduced to the detonation chamber. For example, operating variables associated with the pressure of the detonation fluid may be normalized and/or tailored for a plurality of different operating conditions. Additionally, or in the alternative, operating variables associated with a location that detonation fluid enters the detonation chamber may be normalized and/or tailored for a plurality of different operating conditions.

Further aspects of the present disclosure are provided by the subject matter of the following clauses:

A combustion system, comprising: a detonation combustor comprising a detonation manifold and one or more detonation chamber walls defining a detonation chamber; wherein the detonation manifold comprises a plurality of detonation fluid pathways defined by a monolithic structure of the detonation manifold, and a plurality of detonation orifice groups respectively comprising a plurality of detonation orifices disposed about a surface of the detonation manifold; wherein respective ones of the plurality of detonation orifice groups provide fluid communication from a corresponding one of the plurality of detonation fluid pathways to the detonation chamber through the plurality of detonation orifices corresponding to the respective one of the plurality of detonation orifice groups; and wherein the plurality of detonation orifices are symmetrically oriented about a reference element of the detonation combustor.

The combustion system of any clause herein, wherein the plurality of detonation orifices are axisymmetrically oriented about a longitudinal axis of the detonation chamber and/or the detonation manifold.

The combustion system of any clause herein, wherein the plurality of detonation orifice groups comprises: a first detonation orifice group comprising a plurality of first detonation orifices, and a second detonation orifice group comprising a plurality of second detonation orifices; wherein at least some of the plurality of first detonation orifices are symmetrically adjacent or axisymmetrically adjacent to a respective one of the plurality of second detonation orifices.

The combustion system of any clause herein, wherein at least some of the plurality of first detonation orifices are oriented in an alternating sequence with corresponding ones of the plurality of second detonation orifices.

The combustion system of any clause herein, wherein at least some of the plurality of first detonation orifices are oriented coaxially with respect to corresponding ones of a plurality of second detonation orifices.

The combustion system of any clause herein, wherein some of the plurality of first detonation orifices circumferentially surround a respective one of the plurality of second detonation orifices, and/or wherein some of the plurality of second detonation orifices circumferentially surround a respective one of the plurality of first detonation orifices.

The combustion system of any clause herein, wherein the plurality of detonation orifices have geometric congruence with respect to the reference element of the detonation combustor about which the plurality of detonation orifices are oriented.

The combustion system of any clause herein, wherein the reference element of the detonation combustor comprises: a longitudinal axis of the detonation chamber and/or of the detonation manifold, a respective one of the one or more detonation chamber walls circumferentially surrounding the longitudinal axis, a detonation manifold wall circumferentially surrounding the longitudinal axis, an annular midplane, or a meridian line located at a longitudinal position along the longitudinal axis, the meridian line defining a perimeter of at least one of: the detonation chamber wall, the detonation manifold wall, and the annular midplane.

The combustion system of any clause herein, wherein the plurality of detonation orifices have geometric congruence with respect to at least one of: an annular midplane, and a meridian line that defines a perimeter of the annular midplane at a longitudinal position along the annular midplane.

The combustion system of any clause herein, wherein the annular midplane comprises a cylindrical shape and the meridian line comprises a circular line, or wherein the annular midplane comprises an elliptical cylindrical shape and the meridian line comprises an elliptical line, or wherein the annular midplane comprises a curvilinear cylinder shape and the meridian line comprises a curvilinear line, or wherein the annular midplane comprises a polyhedral prism shape and the meridian line comprises a polygonal line.

The combustion system of any clause herein, wherein the plurality of detonation orifices have geometric congruence with respect to at least one of: a respective one of the one or more detonation chamber walls, the respective one of the one or more detonation chamber walls circumferentially surrounding a longitudinal axis of the detonation chamber; a detonation manifold wall circumferentially surrounding a longitudinal axis of the detonation chamber; and a meridian line that defines a perimeter of the respective one of the one or more detonation chamber walls or that defines a perimeter of the detonation manifold wall.

The combustion system of any clause herein, wherein the plurality of detonation orifices are uniformly spaced about a geometric perimeter defined collectively by the plurality of detonation orifices, the uniformly spaced plurality of detonation orifices comprising at least one of: equidistant spacing and proportionate spacing.

The combustion system of any clause herein, wherein the plurality of detonation orifice groups comprises a first detonation orifice group comprising a plurality of first detonation orifices, and a second detonation orifice group comprising a plurality of second detonation orifices; and wherein the plurality of first detonation orifices are uniformly spaced from one another by a first intra-group perimetric interval, and the plurality of second detonation orifices are uniformly spaced from one another by a second intra-group perimetric interval, the second intra-group perimetric interval differing from the first intra-group perimetric interval.

The combustion system of any clause herein, wherein respective ones of the plurality of first detonation orifices are uniformly spaced from adjacent ones of the plurality of second detonation orifices by an inter-group perimetric interval.

The combustion system of any clause herein, wherein the detonation manifold comprises a plurality of manifold conduits defined by a monolithic structure of the detonation manifold, wherein the plurality of manifold conduits respectively define at least a portion of a respective one of the plurality of detonation fluid pathways; wherein respective ones of the plurality of manifold conduits comprises at least one of: a distribution plenum defined by a monolithic structure of the detonation manifold, the distribution plenum having an annular or a semiannular configuration; and a plurality of outlet conduits leading to respective ones of the plurality of detonation orifices corresponding to the respective one of the plurality of detonation fluid pathways.

The combustion system of any clause herein, wherein the detonation chamber and/or the detonation manifold has a configuration comprising at least one of: an annular elliptical configuration, an annular cylindrical configuration, and an annular polyhedral configuration.

The combustion system of any clause herein, wherein the plurality of detonation fluid pathways comprises: a first detonation fluid pathway in fluid communication with the detonation chamber through a plurality of first detonation orifices corresponding to a first detonation orifice group from among the plurality of detonation orifice groups; and a second detonation fluid pathway in fluid communication with the detonation chamber through a plurality of second detonation orifices corresponding to a second detonation orifice group from among the plurality of detonation orifice groups.

The combustion system of any clause herein, wherein the first detonation fluid pathway is configured to supply a first detonation fluid to the detonation chamber through the plurality of first detonation orifices, and wherein the second detonation fluid pathway is configured to supply a second detonation fluid to the detonation chamber through the plurality of second detonation orifices, wherein the first detonation fluid differs from the second detonation fluid, and wherein the first detonation fluid and the second detonation fluid respectively comprise at least one of: an oxidizer, a fuel, a coolant, and purge air.

A detonation manifold, comprising: a plurality of detonation fluid pathways defined by a monolithic structure of the detonation manifold, and a plurality of detonation orifice groups respectively comprising a plurality of detonation orifices disposed about a surface of the detonation manifold; wherein respective ones of the plurality of detonation orifice groups provide fluid communication from a corresponding one of the plurality of detonation fluid pathways through the plurality of detonation orifices corresponding to the respective one of the plurality of detonation orifice groups; and wherein the plurality of detonation orifices are symmetrically oriented about a reference element of the detonation combustor.

An engine, comprising: an inlet section; a combustor section; and an outlet section; wherein the combustor section comprises the combustion system of any clause herein and/or the detonation manifold of any clause herein.

The engine of any clause herein, wherein the engine comprises: a turbine engine, a rocket engine, a ramjet, a turbo-rocket engine, a turbo-ramjet, or a rocket-ramjet.

The engine of any clause herein, wherein the engine comprises a turbine engine, the turbine engine comprising a turbine section disposed downstream of the combustor section.

The engine of any clause herein, wherein the turbine engine comprises a compressor section disposed upstream of the combustor section.

A method of generating thrust, the method comprising performing detonation in a detonation chamber of a detonation combustor with detonation fluid flowing to the detonation chamber through a first detonation fluid pathway defined at least in part by a monolithic structure of a detonation manifold of the detonation combustor, the first detonation fluid pathway fluidly communicating with the detonation chamber through a first detonation orifice group comprising a plurality of first detonation orifices; and performing detonation in the detonation chamber with detonation fluid flowing to the detonation chamber through a second detonation fluid pathway defined at least in part by the monolithic structure of the detonation manifold, the second detonation fluid pathway fluidly communicating with the detonation chamber through a second detonation orifice group comprising a plurality of second detonation orifices; wherein the plurality of first detonation orifices and the plurality of second detonation orifices are symmetrically oriented about a reference element of the detonation combustor.

The method of any clause herein, wherein the detonation performed while flowing detonation fluid through the first detonation fluid pathway is performed during a first operating state, and the detonation performed while flowing detonation fluid through the second detonation fluid pathway is performed during a second operating state that differs from the first operating state.

The method of any clause herein, wherein the detonation performed while flowing detonation fluid through the first detonation fluid pathway generates a first level of thrust, and the detonation performed while flowing detonation fluid through the second detonation fluid pathway generates a second level of thrust that differs from the first level of thrust.

The method of any clause herein, wherein performing detonation within the detonation chamber comprises: generating a plurality of primary shock waves that propagate annularly through the detonation chamber.

The method of any clause herein, wherein performing detonation within the detonation chamber comprises: generating a plurality of shock waves that propagate longitudinally through the detonation chamber, generating thrust.

The method of any clause herein, wherein the detonation chamber comprises a detonation nozzle, and wherein the detonation combustion products have a velocity of from 1,000 meters per second to 5,000 m/s meters per second downstream of the detonation nozzle.

The method of any clause herein, wherein the method is performed using the combustion system of any clause herein or the engine of any clause herein.

This written description uses exemplary embodiments to describe the currently disclosed subject matter, including the best mode, and also to enable any person skilled in the art to practice such subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A detonation combustion system, comprising:
a detonation combustor comprising a detonation manifold and one or more detonation chamber walls defining a detonation chamber;
wherein the detonation manifold comprises a plurality of detonation fluid pathways defined by a monolithic structure of the detonation manifold, and a plurality of detonation orifice groups respectively comprising a plurality of detonation orifices disposed about a surface of the detonation manifold;
wherein respective ones of the plurality of detonation orifice groups provide fluid communication from a corresponding one of the plurality of detonation fluid pathways to the detonation chamber through the plurality of detonation orifices corresponding to a respective one of the plurality of detonation orifice groups; and
wherein the plurality of detonation orifices are symmetrically oriented about a reference element of the detonation combustor.

2. The detonation combustion system of claim 1, wherein the plurality of detonation orifices are axisymmetrically oriented about a longitudinal axis of the detonation chamber and/or the detonation manifold.

3. The detonation combustion system of claim 1, wherein the plurality of detonation orifice groups comprises:
a first detonation orifice group comprising a plurality of first detonation orifices, and a second detonation orifice group comprising a plurality of second detonation orifices;
wherein at least some of the plurality of first detonation orifices are symmetrically adjacent or axisymmetrically adjacent to a respective one of the plurality of second detonation orifices.

4. The detonation combustion system of claim 3, wherein at least some of the plurality of first detonation orifices are oriented in an alternating sequence with corresponding ones of the plurality of second detonation orifices.

5. The detonation combustion system of claim 3, wherein at least some of the plurality of first detonation orifices are oriented coaxially with respect to corresponding ones of a plurality of second detonation orifices.

6. The detonation combustion system of claim 5, wherein some of the plurality of first detonation orifices circumferentially surround a respective one of the plurality of second detonation orifices, and/or wherein some of the plurality of second detonation orifices circumferentially surround a respective one of the plurality of first detonation orifices.

7. The detonation combustion system of claim 1, wherein the plurality of detonation orifices have geometric congruence with respect to the reference element of the detonation combustor about which the plurality of detonation orifices are oriented.

8. The detonation combustion system of claim 1, wherein the reference element of the detonation combustor comprises: a longitudinal axis of the detonation chamber and/or of the detonation manifold, a respective one of the one or more detonation chamber walls circumferentially surrounding the longitudinal axis, a detonation manifold wall circumferentially surrounding the longitudinal axis, an annular midplane, or a meridian line located at a longitudinal position along the longitudinal axis, the meridian line defining a perimeter of at least one of: the respective one of the one or more detonation chamber walls, the detonation manifold wall, and the annular midplane.

9. The detonation combustion system of claim 1, wherein the plurality of detonation orifices have geometric congruence with respect to at least one of: an annular midplane, and a meridian line that defines a perimeter of the annular midplane at a longitudinal position along the annular midplane.

10. The detonation combustion system of claim 9, wherein the annular midplane comprises a cylindrical shape and the meridian line comprises a circular line, or wherein the annular midplane comprises an elliptical cylindrical shape and the meridian line comprises an elliptical line, or wherein the annular midplane comprises a curvilinear cylinder shape and the meridian line comprises a curvilinear line, or wherein the annular midplane comprises a polyhedral prism shape and the meridian line comprises a polygonal line.

11. The detonation combustion system of claim 1, wherein the plurality of detonation orifices have geometric congruence with respect to at least one of:
- a respective one of the one or more detonation chamber walls, the respective one of the one or more detonation chamber walls circumferentially surrounding a longitudinal axis of the detonation chamber;
- a detonation manifold wall circumferentially surrounding a longitudinal axis of the detonation chamber; and
- a meridian line that defines a perimeter of the respective one of the one or more detonation chamber walls or that defines a perimeter of the detonation manifold wall.

12. The detonation combustion system of claim 1, wherein the plurality of detonation orifices have uniform spacing about a geometric perimeter defined collectively by the plurality of detonation orifices, the uniform spacing comprising at least one of: equidistant spacing and proportionate spacing.

13. The detonation combustion system of claim 12, wherein the plurality of detonation orifice groups comprises a first detonation orifice group comprising a plurality of first detonation orifices, and a second detonation orifice group comprising a plurality of second detonation orifices; and
   wherein the plurality of first detonation orifices are uniformly spaced from one another by a first intra-group perimetric interval, and the plurality of second detonation orifices are uniformly spaced from one another by a second intra-group perimetric interval, the second intra-group perimetric interval differing from the first intra-group perimetric interval.

14. The detonation combustion system of claim 13, wherein respective ones of the plurality of first detonation orifices are uniformly spaced from adjacent ones of the plurality of second detonation orifices by an inter-group perimetric interval.

15. The detonation combustion system of claim 1, wherein the detonation manifold comprises a plurality of manifold conduits defined by a monolithic structure of the detonation manifold, wherein the plurality of manifold conduits respectively define at least a portion of a respective one of the plurality of detonation fluid pathways;
   wherein respective ones of the plurality of manifold conduits comprises at least one of:
   - a distribution plenum defined by a monolithic structure of the detonation manifold, the distribution plenum having an annular or a semiannular configuration; and
   - a plurality of outlet conduits leading to respective ones of the plurality of detonation orifices corresponding to the respective one of the plurality of detonation fluid pathways.

16. The detonation combustion system of claim 1, wherein the detonation chamber and/or the detonation manifold has a configuration comprising at least one of: an annular elliptical configuration, an annular cylindrical configuration, and an annular polyhedral configuration.

17. The detonation combustion system of claim 1, wherein the plurality of detonation fluid pathways comprises:
- a first detonation fluid pathway in fluid communication with the detonation chamber through a plurality of first detonation orifices corresponding to a first detonation orifice group from among the plurality of detonation orifice groups; and
- a second detonation fluid pathway in fluid communication with the detonation chamber through a plurality of second detonation orifices corresponding to a second detonation orifice group from among the plurality of detonation orifice groups.

18. The detonation combustion system of claim 17, wherein the first detonation fluid pathway is configured to supply a first detonation fluid to the detonation chamber through the plurality of first detonation orifices, and wherein the second detonation fluid pathway is configured to supply a second detonation fluid to the detonation chamber through the plurality of second detonation orifices, wherein the first detonation fluid differs from the second detonation fluid, and wherein the first detonation fluid and the second detonation fluid respectively comprise at least one of: an oxidizer, a fuel, a coolant, and purge air.

19. A detonation manifold for a detonation combustor, comprising:
- a plurality of detonation fluid pathways defined by a monolithic structure of the detonation manifold, and a plurality of detonation orifice groups respectively comprising a plurality of detonation orifices disposed about a surface of the detonation manifold;
- wherein respective ones of the plurality of detonation orifice groups provide fluid communication from a corresponding one of the plurality of detonation fluid pathways through the plurality of detonation orifices corresponding to a respective one of the plurality of detonation orifice groups; and
- wherein the plurality of detonation orifices are symmetrically oriented about a reference element of the detonation combustor.

20. A method of generating thrust, the method comprising:
- performing detonation in a detonation chamber of a detonation combustor with detonation fluid flowing to the detonation chamber through a first detonation fluid pathway defined at least in part by a monolithic structure of a detonation manifold of the detonation combustor, the first detonation fluid pathway fluidly communicating with the detonation chamber through a first detonation orifice group comprising a plurality of first detonation orifices; and
- performing detonation in the detonation chamber with detonation fluid flowing to the detonation chamber through a second detonation fluid pathway defined at least in part by the monolithic structure of the detonation manifold, the second detonation fluid pathway fluidly communicating with the detonation chamber through a second detonation orifice group comprising a plurality of second detonation orifices;
- wherein the plurality of first detonation orifices and the plurality of second detonation orifices are symmetrically oriented about a reference element of the detonation combustor.

* * * * *